(12) United States Patent
Herbault

(10) Patent No.: US 9,295,322 B2
(45) Date of Patent: Mar. 29, 2016

(54) ANTIPARALLELOGRAM FOLDING STRUCTURE, STROLLER, CHAIR, STOOL, TABLE, PRAM, TROLLEY

(71) Applicant: Patrick Herbault, La Garenne Colombes (FR)

(72) Inventor: Patrick Herbault, La Garenne Colombes (FR)

(*) Notice: Subject to any disclaimer, the term of this patent is extended or adjusted under 35 U.S.C. 154(b) by 0 days.

(21) Appl. No.: 14/403,479

(22) PCT Filed: May 24, 2013

(86) PCT No.: PCT/FR2013/051151
§ 371 (c)(1),
(2) Date: Nov. 24, 2014

(87) PCT Pub. No.: WO2013/175145
PCT Pub. Date: Nov. 28, 2013

(65) Prior Publication Data
US 2015/0115667 A1  Apr. 30, 2015

(30) Foreign Application Priority Data

May 25, 2012 (FR) ..................... 12 54874

(51) Int. Cl.
| B62B 7/08 | (2006.01) |
| A47B 3/00 | (2006.01) |
| B62B 1/20 | (2006.01) |
| B62B 3/02 | (2006.01) |
| A47C 4/04 | (2006.01) |

(52) U.S. Cl.
CPC . *A47B 3/002* (2013.01); *A47C 4/04* (2013.01); *B62B 1/208* (2013.01); *B62B 3/02* (2013.01); *B62B 7/08* (2013.01); *B62B 7/086* (2013.01); *B62B 2205/003* (2013.01); *B62B 2205/02* (2013.01)

(58) Field of Classification Search
CPC .......... B62B 1/208; B62B 7/06; B62B 7/062; B62B 7/064; B62B 7/066; B62B 3/02; B62B 3/022; B62B 2205/00; B62B 2205/06; B62B 7/08; B62B 7/086; B62B 2205/02; B62B 2205/003; A47B 3/002; A47C 4/04
See application file for complete search history.

(56) References Cited

U.S. PATENT DOCUMENTS 3,992,038 A * 11/1976 Guadano, Sr. ................. 280/659
5,123,665 A *  6/1992 Levy ............................... 280/35

(Continued)

FOREIGN PATENT DOCUMENTS

WO     2010/000987 A1    1/2010

OTHER PUBLICATIONS

International Search Report issued in International Patent Application No. PCT/FR2013/051151, dated Jul. 11, 2013.

*Primary Examiner* — John Walters
*Assistant Examiner* — Brian Swenson
(74) *Attorney, Agent, or Firm* — Pillsbury Winthrop Shaw Pittman LLP

(57) ABSTRACT

A foldable bearing structure includes a set of coplanar wheels and a folding device including a set of lower arms; at least a rear upper arm; an antiparallelogram deformable in a vertical plane, the antiparallelogram including two crossed segments; at least a first sidebar located in the vertical plane; the antiparallelogram deformed by folding between a first position, corresponding to an unfolded of the structure and a second position corresponding to a folded position, the transition from the first position to the second position reducing the wheelbase of the structure.

25 Claims, 29 Drawing Sheets

(56) References Cited

U.S. PATENT DOCUMENTS

| | | | | |
|---|---|---|---|---|
| 5,702,120 | A * | 12/1997 | Malofsky et al. | 280/642 |
| 8,360,461 | B2 * | 1/2013 | Henry | 280/648 |
| 8,944,457 | B2 * | 2/2015 | Rembisz et al. | 280/647 |
| 2007/0024029 | A1 | 2/2007 | Dotsey et al. | |
| 2009/0302577 | A1 * | 12/2009 | Ageneau et al. | 280/642 |
| 2011/0089670 | A1 * | 4/2011 | Henry | 280/647 |
| 2011/0227373 | A1 | 9/2011 | Cone, II | |
| 2014/0338574 | A1 * | 11/2014 | Wen | 108/177 |

\* cited by examiner

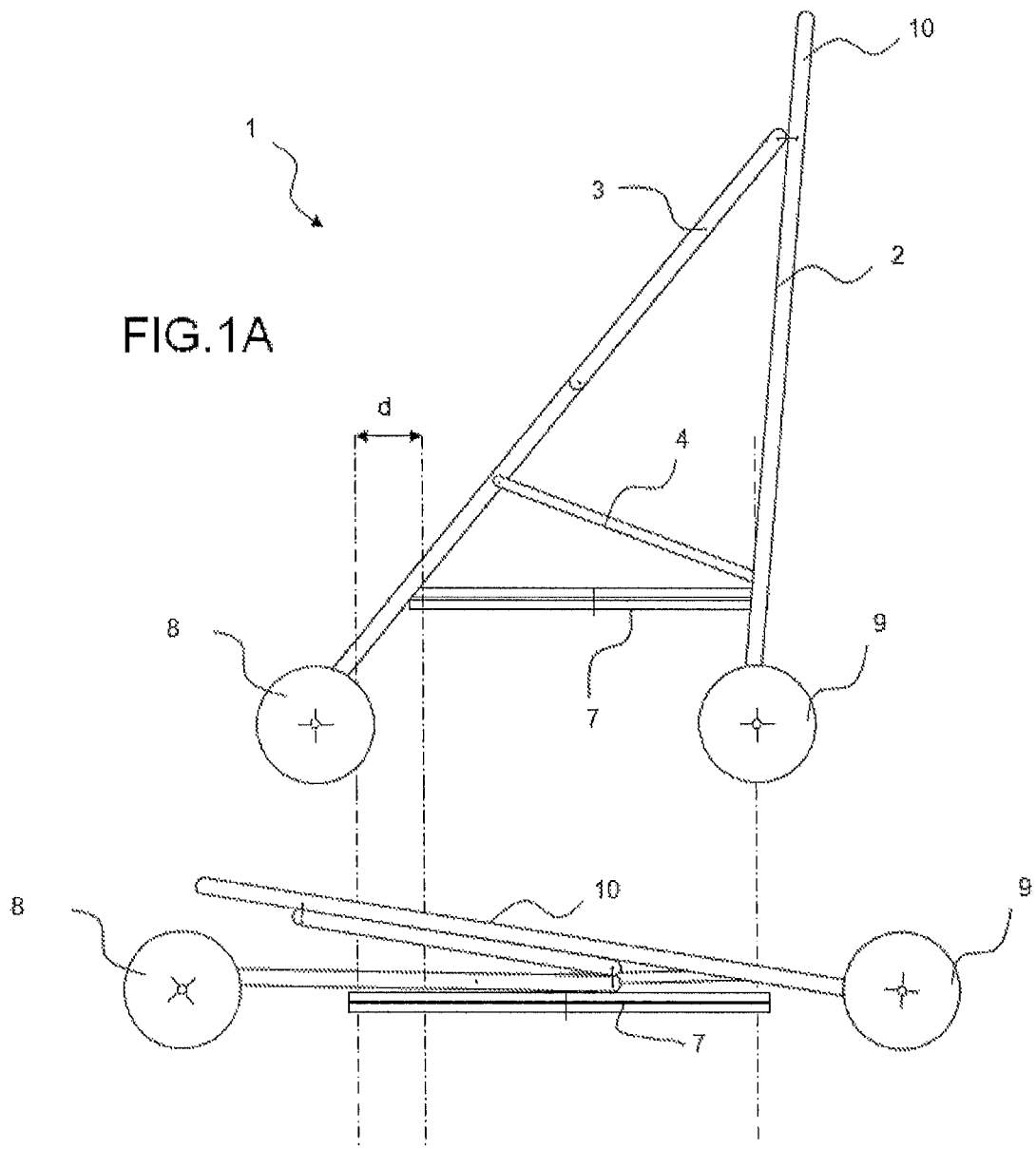

ANTIPARALLELOGRAM FOLDING STRUCTURE, STROLLER, CHAIR, STOOL, TABLE, PRAM, TROLLEY

CROSS REFERENCE TO RELATED APPLICATIONS

This application is the U.S. National Stage of PCT/FR2013/051151, filed May 24, 2013, which in turn claims priority to French Patent Application No. 1254874, filed May 25, 2012, the entire contents of all applicants are incorporated herein by reference in their entireties.

FIELD

The invention relates to antiparallelogram folding structures, including weight bearing structures. More specifically, for certain applications, the invention relates to collapsible strollers and prams. The invention relates, in particular, to folding devices for strollers, in order to reduce their size when folded.

STATE OF THE ART

Currently, there are different technical solutions to fold and unfold strollers. Among these solutions, there is a whole family of strollers which fold by associating a folding movement of the guiding structure with a reduction in width of the latter. Within this family, there are particular models of the Maclaren™ type, an example of which is shown in FIG. 1. These models reduce in size in space when folded.

FIG. 1A shows an unfolded stroller 1 comprising a guiding frame, itself comprising guiding handles 10, the rear arms 2, front arms 3 and connecting means 4. Furthermore, the stroller comprises a set of front wheels 8, rear wheels 9 and a first folding device 7 located in a horizontal plane which is substantially parallel to the horizontal plane containing the contact points or the wheels.

FIG. 1B shows a folded stroller 1. Connection means 4 allow a folding of the frame by bringing it in the same plane as that of wheels 8, 9. The height reduction of the stroller is performed by lowering the guiding structure in a substantially horizontal plane.

FIG. 2A shows a top view of stroller 1, in an unfolded configuration. The first folding device 7 forms a foldable cross, mainly around a central axis of rotation. The frame in top view intersects the plane of rods 2, 3.

FIG. 2B shows a top view of stroller 1, in a folded configuration. The cross of the first folding device 7 has completed a rotational movement leading to each side of the guiding frame to fold towards each other so as to reduce the width of the stroller.

The width reduction is obtained during the folding by the partial closure of a cross-shaped system placed horizontally These existing mechanisms are tried and tested and produced in industrial quantities. The resulting folding is generally compact. However, to our knowledge, this folding has some drawbacks which include:

To only offer a folded or unfolded position, without the ability to offer intermediate folding positions which could be useful in limited space situations such as: maneuver the stroller in an elevator, in airplane corridor, or in the middle of a crowd.

For some models, the lack of ease and ergonomics of the folding, for example, allowing if need be, to fold or unfold the stroller by keeping the wheels on the ground without having to lift either pair of front or rear wheels.

Another such example is being forced to carry the stroller, unless it is very light, which is not the case of double strollers and prams.

The resulting compactness is generally not optimized.

One drawback of the existing solutions is the still important size of the folded stroller, in particular its height and length.

Indeed, the folding kinematic causes a greater overall length when folded that in the unfolded position. This increase is due to the combination of the cross-shaped device closure in the horizontal plane, the folding movements of the guiding frame in the horizontal plane and the size of the wheels.

SUMMARY OF THE INVENTION

The invention overcomes the aforementioned drawbacks.

One part of the invention relates to a folding bearing structure comprising of multiple coplanar support points, with at least two rear support points and at least one front support point. The bearing structure of the invention comprises at least one folding device which itself comprises:
  a set of lower arms comprising of at least one front arm and a rear arm which respectively comprise a first end, each being connected to a support point;
  at least one rear upper arm
  an antiparallelogram deformable in a vertical plane, said antiparallelogram comprising at least two crossed segments which have:
    a first end and a second end each being fixed by means of a first and a second attachment to a first end of the front lower arm and a first end of the rear lower arm respectively
    a third end and a fourth end each being fixed by means of a third and a fourth attachment to a first point on the front lower arm and a first point of the rear lower arm respectively;
  at least a first sidebar located in the vertical plane, said sidebar:
    being fixed by means of a fifth attachment by a first end of said first sidebar to the first end of the front lower arm;
    being fixed by means of a sixth attachment to the rear upper arm at a first upper point such that the length of the first sidebar is very similar to the first segment formed by the second end and the third end of the antiparallelogram and approximately parallel to said first segment.
  The antiparallelogram being deforms by folding between a first position, called the unfolded position of the structure and a second position, called the folded position, the change from the first position to the second position reducing the wheelbase of the structure.

According to one embodiment of the invention, the structure comprises two sides, the distance separating the two sides defining the width of the structure, each of the sides being defined in a vertical plane and comprising at least one distinct rear support point for each of the sides and at least one front support point, said bearing structure comprising two folding devices (20), each comprising an antiparallelogram (CDEF) deformable in the plane of one of the sides of the structure, the structure also comprising a central folding system to reduce the open width of the structure as it changes between the first folding position and the second folding position.

In one embodiment, the central collapsible system is a central foldable cross. In the case of a central cross, fixing points C and D of the cross of one side and the points associated to points C and D of the second side are of interest to obtain a given bending ratio between the width and the length of the cross. When the central folding system is another device, another bending ratio between the length and width of the central folding system can be defined. In this latter case, a set of points C' and D' can be defined on the upper arm, for example, typically between, on the one hand point C and point I and on the other hand, between point D and point J. Points I and J are shown in FIG. 9.

Similarly, points C" and D" can be defined on the lower arms to set the central folding system, for example, typically between firstly point C and point K and secondly between point D and point L. Points K and L are shown in FIG. 9.

One advantage is to reduce the wheelbase of the bearing structure, that is to say a reduction of the distance between the front contact points and rear contact points of the structure. Indeed, usually, folding such as those seen in stroller type structures extend the length of the stroller.

Another advantage is that the structure can easily be integrated into many mechanisms since simple pivot links may be attached to the ends of the bearing structure.

Advantageously, each support point is located on a wheel, said structure comprising:
  a first set of front wheels and a second set of rear wheels;
  wheel supports including lower front arms and lower rear arms each comprising respectively a first extremity connecting the rotational axes of the wheels with the bearing structure.

An advantage of this embodiment is to save space by folding the wheel inwardly of the bearing structure. The aim of the gain of compactness is to allow, for example, to store a stroller-type structure in the passenger compartment of an airplane.

Advantageously, each rear wheel is respectively located in the same longitudinal axis as each front wheel, a front and rear wheel forming the wheels on the one side and respectively the wheels of a second side of the structure.

In an alternative, a slight axial offset between a rear wheel and a wheel on the same side allows for unhindered folding of the wheels on the same side.

Advantageously, the structure comprises two sides, each side being defined by a vertical plane comprising at least one separate rear support point for each of the sides and at least one front support point, said structure comprising two folding devices, each comprising an antiparallelogram deformable in the plane of one of the sides of the structure.

This arrangement is particularly advantageous for the symmetric structures located on both of its sides. The two lateral folding devices can be synchronized for example by means of a Maclaren type cross in a horizontal plane. The connections at the ends of the Maclaren type cross and on the lower ends of the antiparallelogram structure can be fixed.

Advantageously, the first, second, third, fourth and fifth fasteners are pivot links.

These links allow for greater maneuverability while also being usable as a clamp, blocking or stiffening device. Furthermore, all pivot links lead to an interdependence of movement enabling the synchronization of the front and rear folding. Furthermore, they are mechanisms capable of propagating the folding movements to another folding device.

Advantageously, the lower front arm of each side of the structure performs a first rotational movement around the first extremity of the antiparallelogram when going from the first position to the second position and vice versa.

Advantageously, the lower rear arm and the upper rear arm of each side of the structure performs a second rotational movement around the fourth end (F) of the antiparallelogram when going from the first position to the second position and vice versa.

Advantageously, the triangle formed by the first end of the antiparallelogram, the fourth end of the antiparallelogram and the upper point is an isosceles triangle whose vertex is the first end of the antiparallelogram. The triangle remains isosceles in all folding positions.

Advantageously, the folding device comprises a first synchronization device of the first and second rotational movement.

Advantageously, the first synchronization device of the first and second rotational movement is realized by means of the sidebar.

Advantageously, the bearing structure comprises a folding synchronization device of the two folding devices.

Advantageously, the folding device comprises an upper front arm and a second sidebar, said second sidebar:
  being fixed by means of a seventh attachment by a first end of said second sidebar to the first end of the rear lower arm;
  being fixed by means of an eighth attachment to the front upper arm at a second upper point such that the length of the first sidebar is very similar to the second segment formed by the first and the fourth ends of the antiparallelogram and approximately parallel to said second segment.

Advantageously, the two second sidebars form an antiparallelogram, the seventh and eighth attachments being pivot links.

Advantageously, the structure comprises a guide frame to guide the bearing structure when the wheels are in the first position.

Advantageously, the guiding frame comprises means to guide the bearing structure and a foldable stiffening device used on the one hand to keep the upper rear arms at a predefined maximum distance, and on the other hand to reduce the width between the upper rear arms when a second folding is performed.

Advantageously, the stiffening device keeps the rear arms and the rear support points in the same plane.

Advantageously, the stiffening device is attached to the upper rear arms of the structure and comprise eight links attached by pivot links, including a first pair of isosceles quadrilaterals of the same dimensions and a second pair of isosceles quadrilaterals of the same dimensions, each quadrilateral's length of the narrow side being substantially close to the long side length of the quadrilateral of the first pair being an homothetic of the quadrilaterals of the second pair, the eight connections having a locking position to hold the rear arms in a position of maximum separation.

Advantageously, the stiffening device includes a multitude of rods attached together by pivot links and by pivot links to the upper rear arms, said rods being connected together by at least one antiparallelogram to synchronize the folding of each set of rods.

Advantageously, the stiffening device includes a slide bar and a set of rods to hold the slider bar, and between the rear arms, said rods being held to the upper rear arms by pivot links, a first set of rods being connected to the slider bar by a sliding and pivot link and a second set of rods being connected to the sliding bar by a pivot link.

Advantageously, the propagation means allow the synchronization of the folding of at least one folding device with the folding of the stiffening device so that a folding of the stiffening device causes the folding of at least one folding device.

Advantageously, the foldable stiffening device comprises a motor which allows the folding and/or unfolding itself allowing to increase or decrease the width between the upper rear arms.

Another object of the invention relates to a stroller comprising a bearing structure according to the invention.

Another object relates to a pram comprising a bearing structure which conforms to the invention by comprising two upper front arms and two associated second sidebars connecting the upper front arms to the support structure. The second sidebars being symmetrical to the first sidebars.

Another object relates to a folding table comprising a removable tray and/or foldable, and a bearing structure according to the invention. Another object relates to a folding wheelbarrow with a removable tray and/or foldable, an extension arm and a bearing structure according to the invention.

Another object relates to a trolley comprising a bearing structure.

BRIEF DESCRIPTION OF FIGURES

Other features and advantages of the invention will appear upon reading the following detailed description, with reference to the accompanying figures, which illustrate:

FIGS. 1A, 1B, 2A, 2B: different views of a foldable stroller of the existing type;

DESCRIPTION

Definitions

In the following description, the term "wheelbase" is meant as the distance between the axis connecting the front support points and the axis connecting the rear support points of a structure without a wheel.

The wheelbase usually describes the distance between the axis connecting the front wheels and the axis connecting the rear wheels of a structure comprising at least two front wheels and two rear wheels.

In the case of a structure with a single front wheel, the wheelbase is the distance between the axis of the front wheel and the rear wheels axis (having the same axis).

In the following description, an "antiparallelogram structure" is meant as a structure which effectively forms an antiparallelogram, that is to say a crossed quadrilateral whose non adjacent sides are the same length forming a foldable cross inside.

In addition, an antiparallelogram has different properties which are: the opposite angles of the structure forming the cross have the same measurement. In an antiparallelogram, diagonals are parallel and it has an axis of symmetry which is a perpendicular bisector of the diagonals. It is also noted that an antiparallelogram can be inscribed in a circle and that two opposite sides have their point of intersection on this bisector.

A compact stroller describes a stroller with a three dimensional folding mode, allowing it to shrink in length and width. It is also called an "umbrella stroller".

A "Maclaren type cross" is meant as foldable cross named after its inventor which consists of two segments connected by a common pivot in the middle of the two segments and therefore at the center of the cross used in an umbrella stroller to at least fold in a horizontal plane. The folds are synchronized by using a propagation structure which will enable the folding of a second vertical cross or stiffening system through the folding of the first horizontal cross.

Figure 2A:
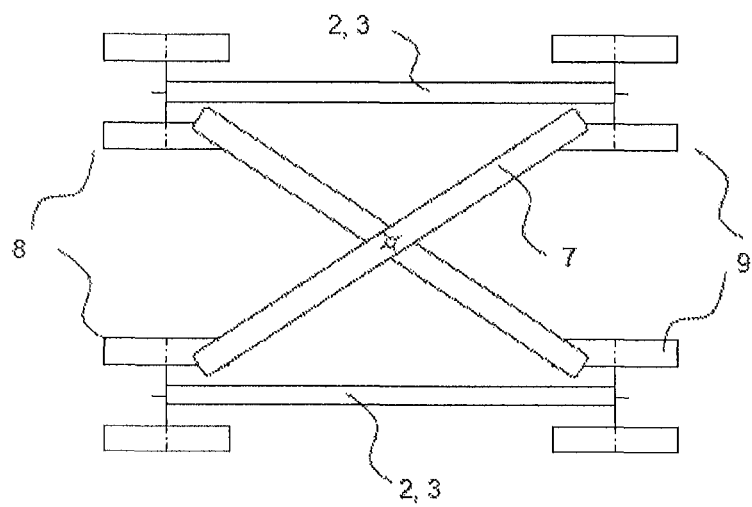
Figure 2B:
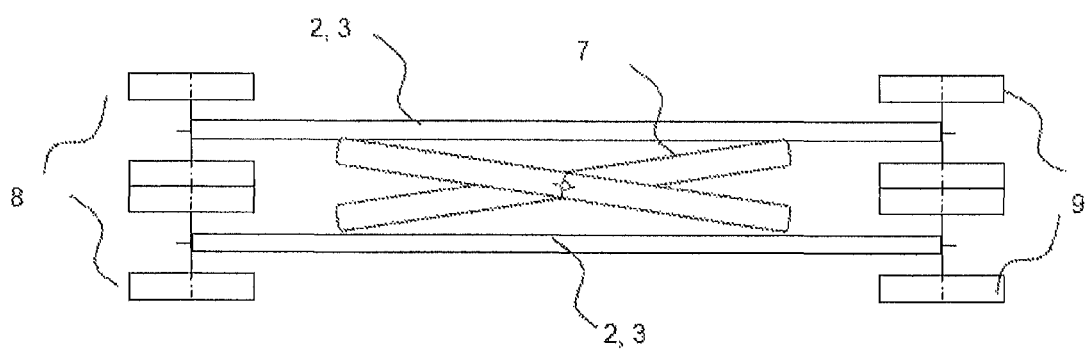
Figure 3A:
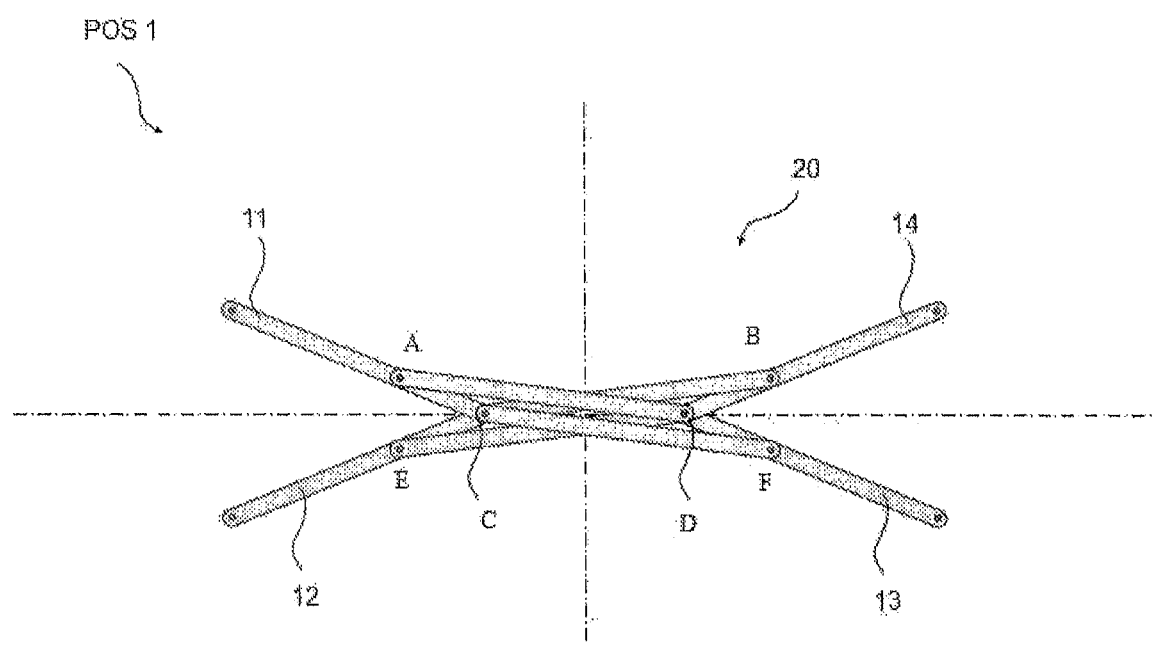
FIGS. 3A to 3G: different folding positions of the folding device for a bearing structure of the invention.
Figure 3B:
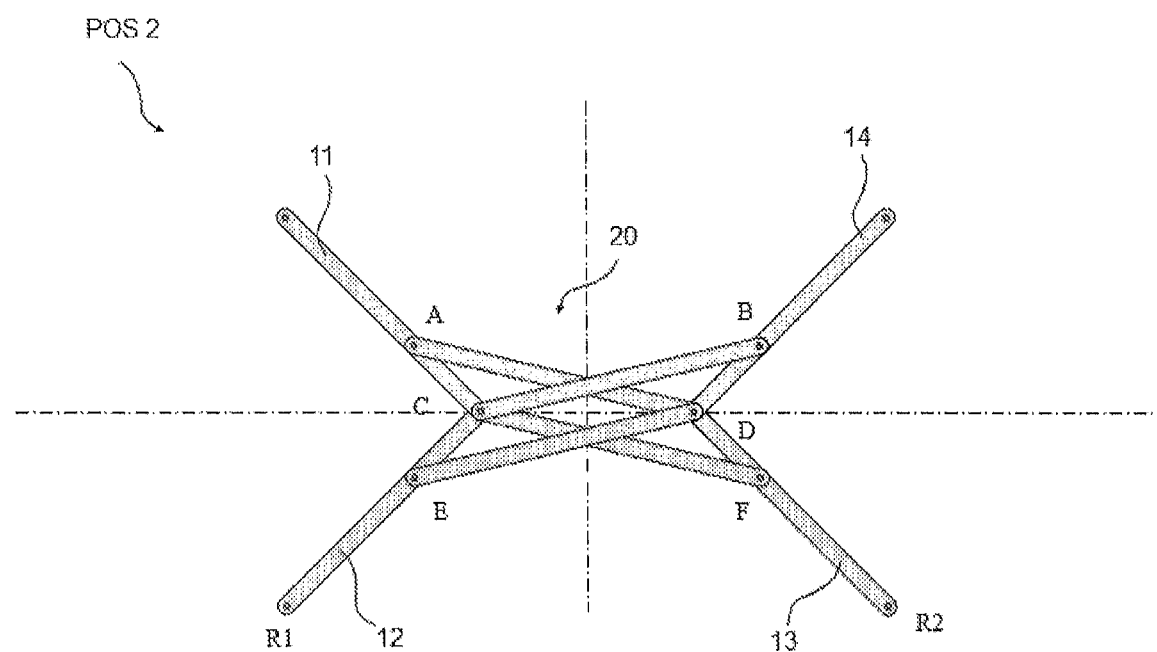
Figure 3C:
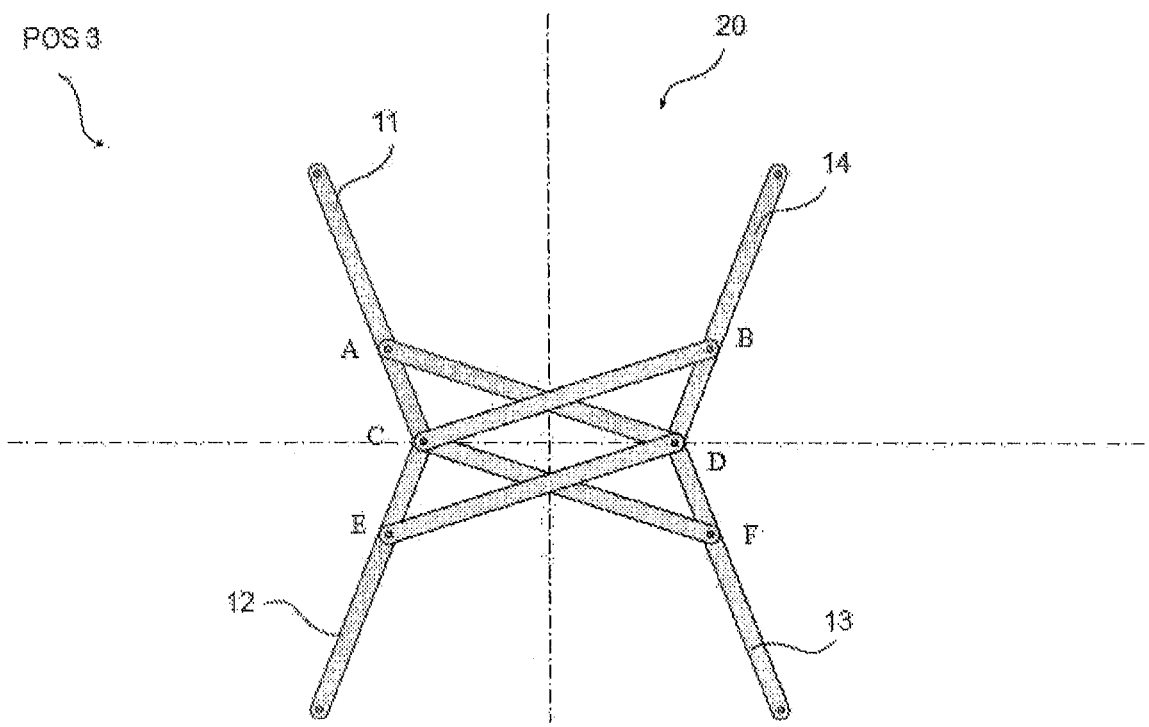
Figure 3D:
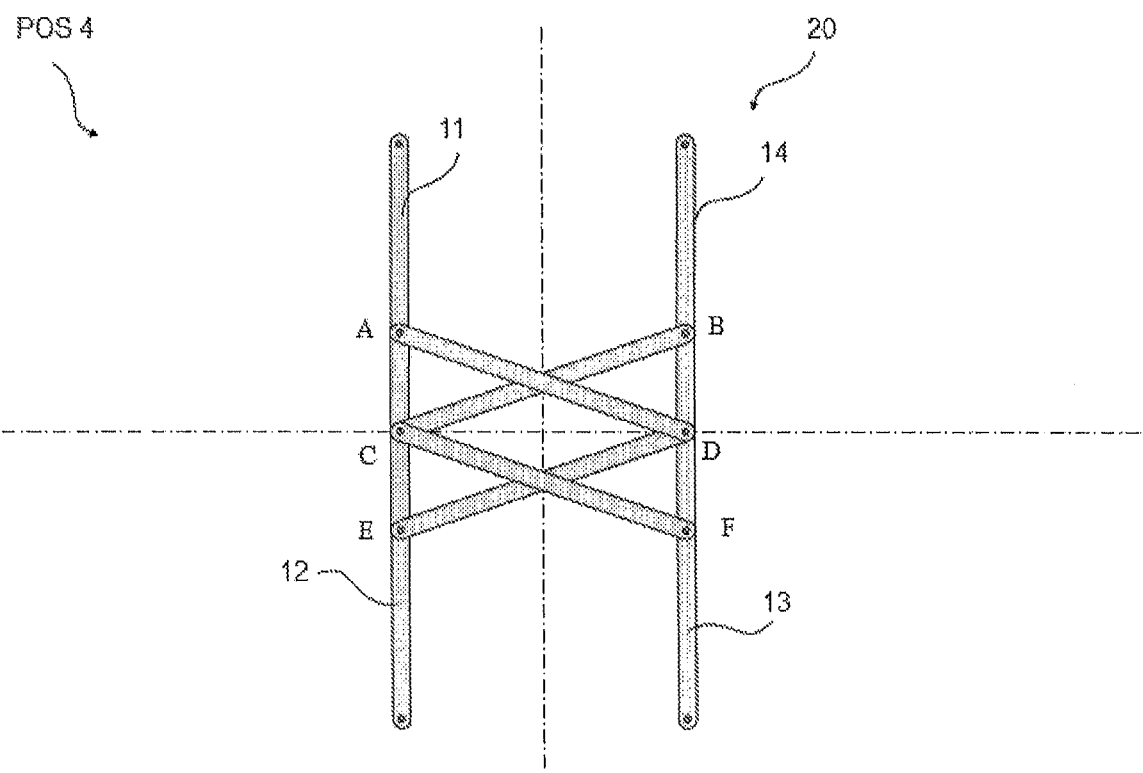
Figure 3E:
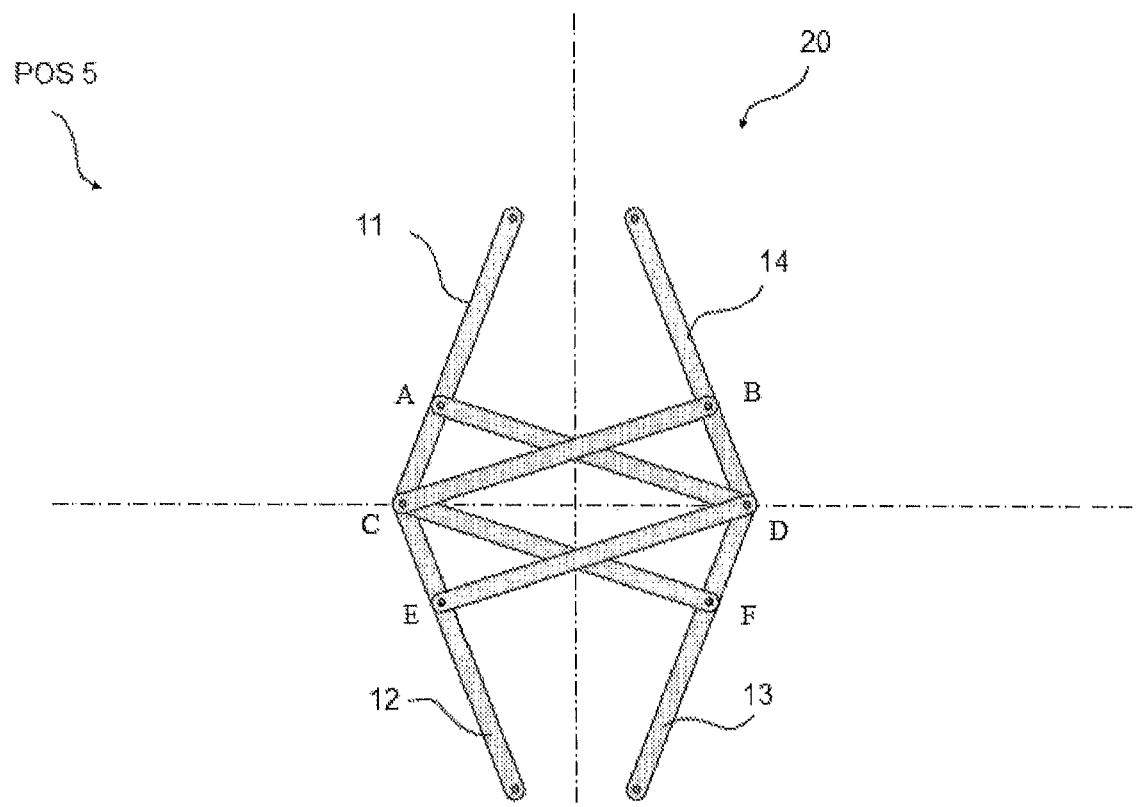
Figure 3F:
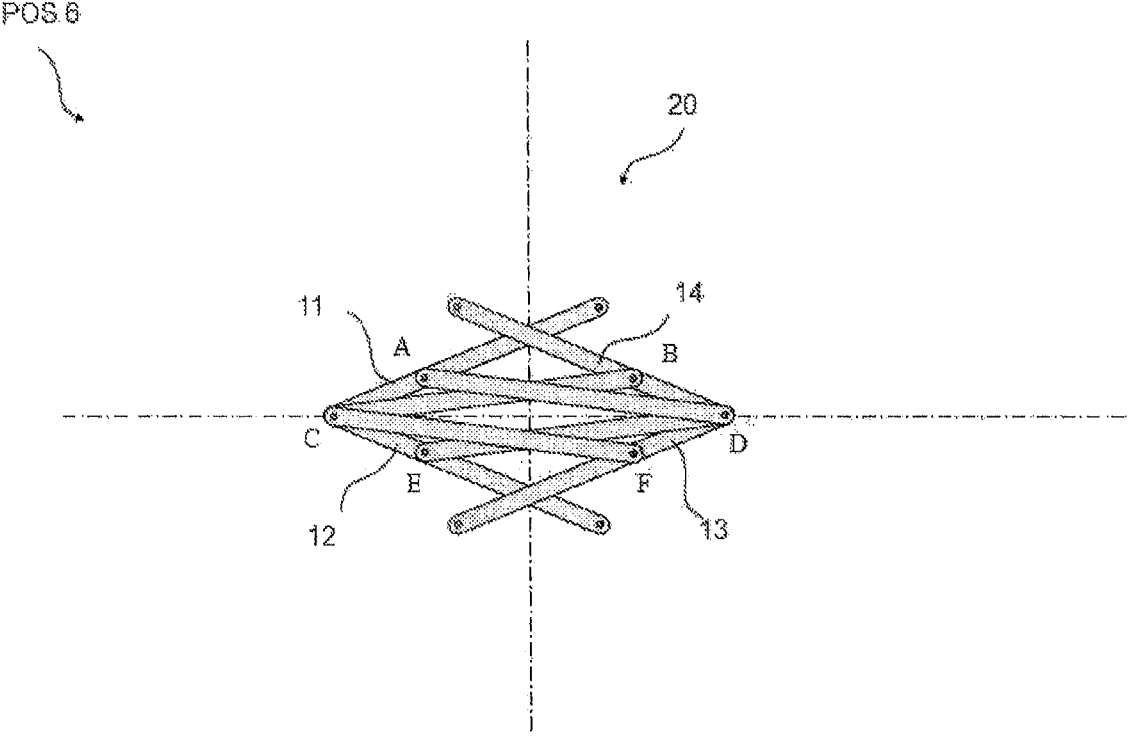

FIG. 3A illustrates the mode of operation of a folding device for a bearing structure according to the invention. This device is placed on one side of the structure. The structure thus comprises two folding devices. FIGS. 3A to 3G illustrate only one folding device.

In order to better illustrate the rotational movements, symmetry and folding of the device, FIGS. 3A to 3G are also show an arm (11) and a sidebar (AD) which are unnecessary in a main embodiment of the invention, where the structure of the invention is a stroller for example. They are only shown to better understand the invention without imposing restrictions to the folding device and the bearing structure of the invention. However, in an embodiment such as a pram, arm 11 and sidebar AD may be present in order to achieve a symmetrical bearing structure by providing a substantially flat weight bearing surface for example.

FIGS. 3A to 3G show different relative positions for different folds POS_1, POS_1, POS_2, POS_3, POS_4, POS_5, POS_6, POS_7 of a folding device intended to be arranged at one side of a bearing structure in accordance with the invention.

According to one embodiment, lower front arms 12 and lower rear arms 13 of the folding device can be used to be attached to wheel supports substantially their center of rotation, ie points R1 and R2 shown in FIGS. 3A to 3F.

Upper rear arms 14 allow to attach each folding device arranged on one side of the bearing structure to a guide frame to guide the bearing structure when the wheels are fixed to the lower ends of the lower arms.

When the folding device is used with a bearing structure such as a stroller, upper arm 11 is not needed in the folding device, and neither is sidebar AD. It is only represented to illustrate some possible symmetry of the folding device Folding device 20 of the bearing structure of the invention comprises an antiparallelogram CDEF forming a cross structure in such a way that triangle BCF stays isosceles whatever the folding or the position of the device.

The folding device comprises lower arms 12, 13 fixed to ends C, D, E, F of the CDEF antiparallelogram by pivot links. Arms 12, 13 each rotate around a center of rotation, C for arm 12 and D for arm 13. The upper ends of the lower arms are fixed to both ends of the antiparallelogram CDEF.

FIGS. 3A to 3G show different positions during a rotating movement of the folding device around centers C and D.

In addition, a sidebar CB is arranged such that it is fixed to end C of the antiparallelogram CDEF which also corresponds to the end of the lower front arm 12. The connection between side arm CB and arm 12 is provided by a pivot link.

According to one embodiment, the upper end of the sidebar is attached to upper rear arm 14 at a point B such that triangle BCF is isosceles regardless of the folding position and so that segments ED and CB are parallel irrespective of the folding position of folding device 20.

Through antiparallelogram CDEF and sidebar CB, rotations around centers C and D are synchronized.

The pivot links may include notches in the connection bars to allow passage of the pivots and/or shaping their profile and/or add U profiles. This solution allows to reduce or to eliminate interference problems with pivot axes.

To better understand the folding movement, let us consider a folding device 20 of the structure of the invention to which are added a front upper arm 11 and sidebar AD which links end D to a point on upper front arm 11. Folding device 20 then comprises four articulated arms 11, 12, 13, 14 on a common rotation point C or D depending on the side. When considering upper front arm 11 and sidebar AD, the arms are now connected by two pairs of crossed links which, with the two arm segments, form antiparallelograms ABCD and CDEF. Due to the symmetry of the antiparallelogram, the angles of the device are identical on either side and will be a way to perfectly synchronize the rotation of each arm on each side.

Both antiparallelograms CDEF and ABCD are identical, which leads to triangles ADE and BCF being isosceles and also ensures the symmetry between the upper part and the lower part of folding device 20.

The folding device remains symmetrical about the vertical axis, the horizontal axis or the center where the two axes intersect. These constraints require a synchronization of the folds of the folding device.

Figure 3G:
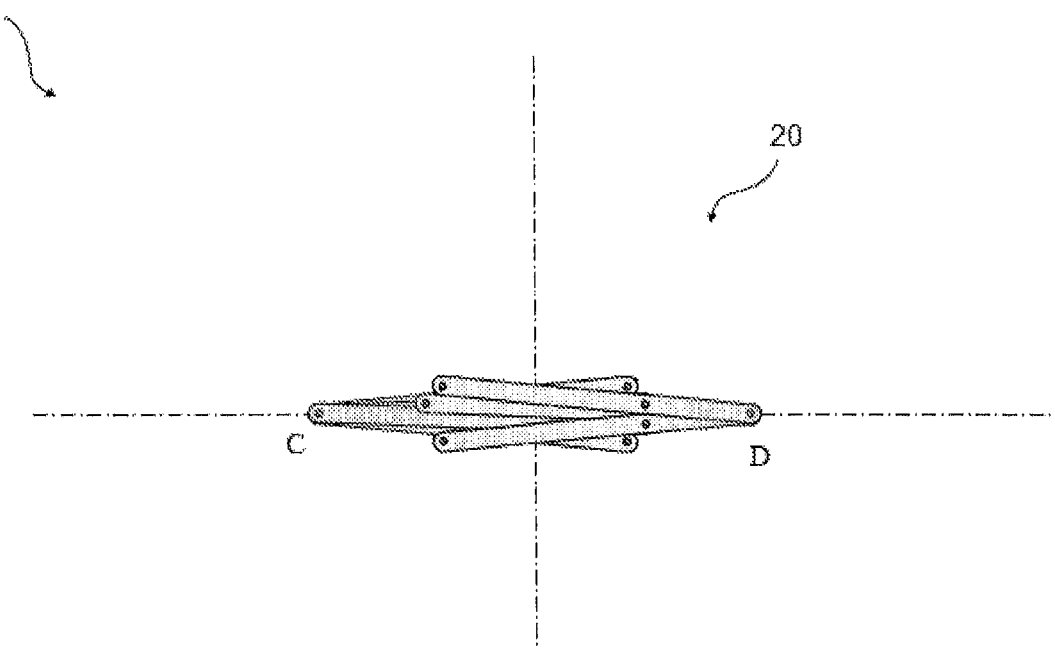

FIG. 3G shows a folding device in its most compact folded position in which the maximum length of the device is defined by segment CD.

Figure 4A:
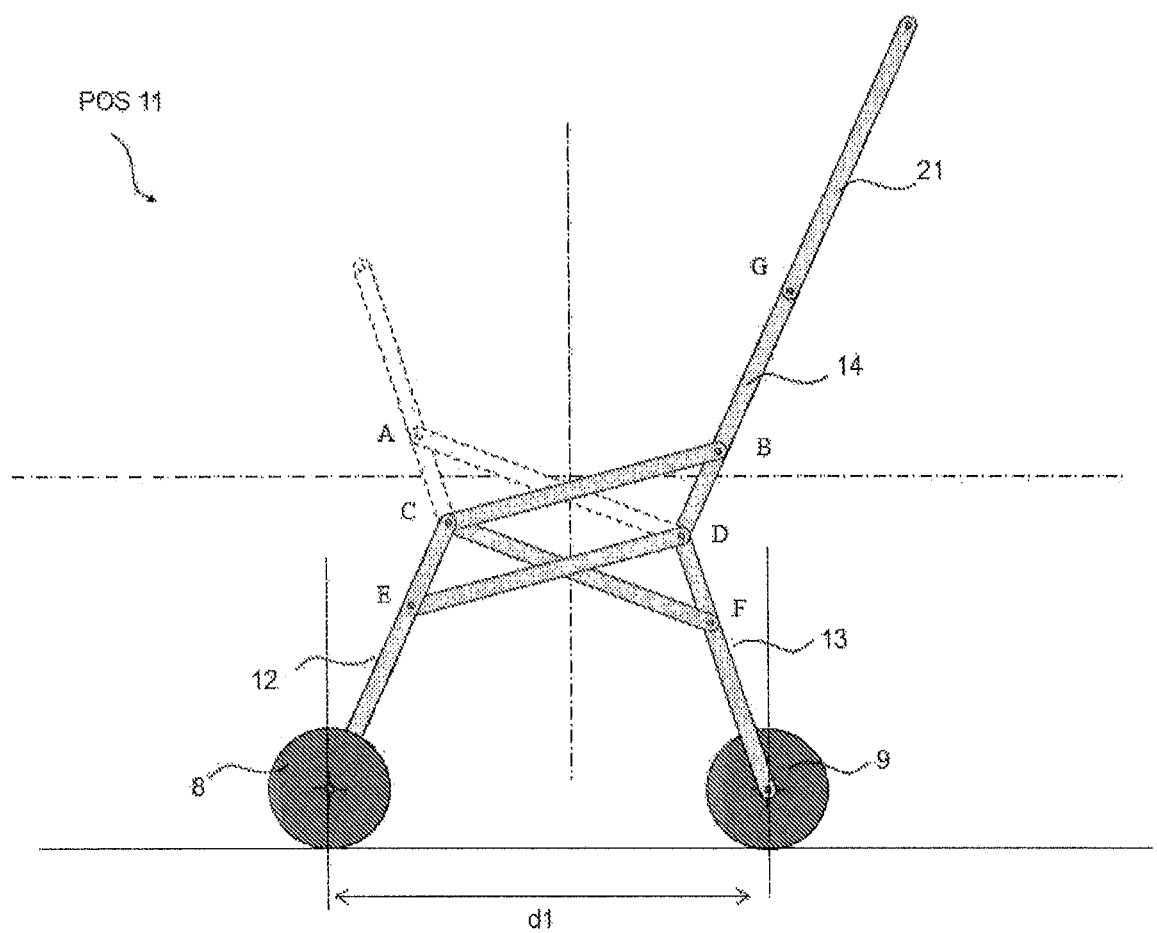
FIGS. 4A to 4G: different folding positions of a bearing structure of the invention in a stroller configuration.

FIG. 4A shows an example of a bearing structure such as a stroller. The latter does not include upper arm 11 and sidebar AD.

In this embodiment of the bearing structure of the invention, guide frame 21 guides the bearing structure when the wheels are in the first position. The guide frame may include upper arms 21 and handles or a hoop or at least a rod having a shape suitable for pushing and guiding the structure when driven.

The guide frame is in one embodiment attached to the upper arms of at least one folding device by means of a pivot joint G. The frame is preferably fixed to both sides of the stroller on the folding devices 20 level.

Other embodiments are possible. In particular, the upper rear arm can be extended by a fixed part which terminates into a handle. It can be telescopic, which mean the length of the arms can be adjusted and therefore the position of the handles can be adjusted too. It may also be extended by an articulated part around a point of rotation, controllable independently.

FIGS. 4A to 4G show various stroller folding positions: POS_10, POS_11, POS_12, POS_13, POS_14, POS_15, POS_16, POS_17 particularly when a first folding PL1 is initiated. Folding PL_1 shown in FIG. 4C, can be made from a movement of the guide frame towards the front of the structure defining a rotation relative to point D which is the upper rear vertex of antiparallelogram CDEF.

Guide frame 21 and rear arm 14 tip by forward rotation of the structure according to a folding PL_1. The folds are synchronized thanks to folding device 20 on each side of the stroller around centers of rotation C and D.

Figure 4B:
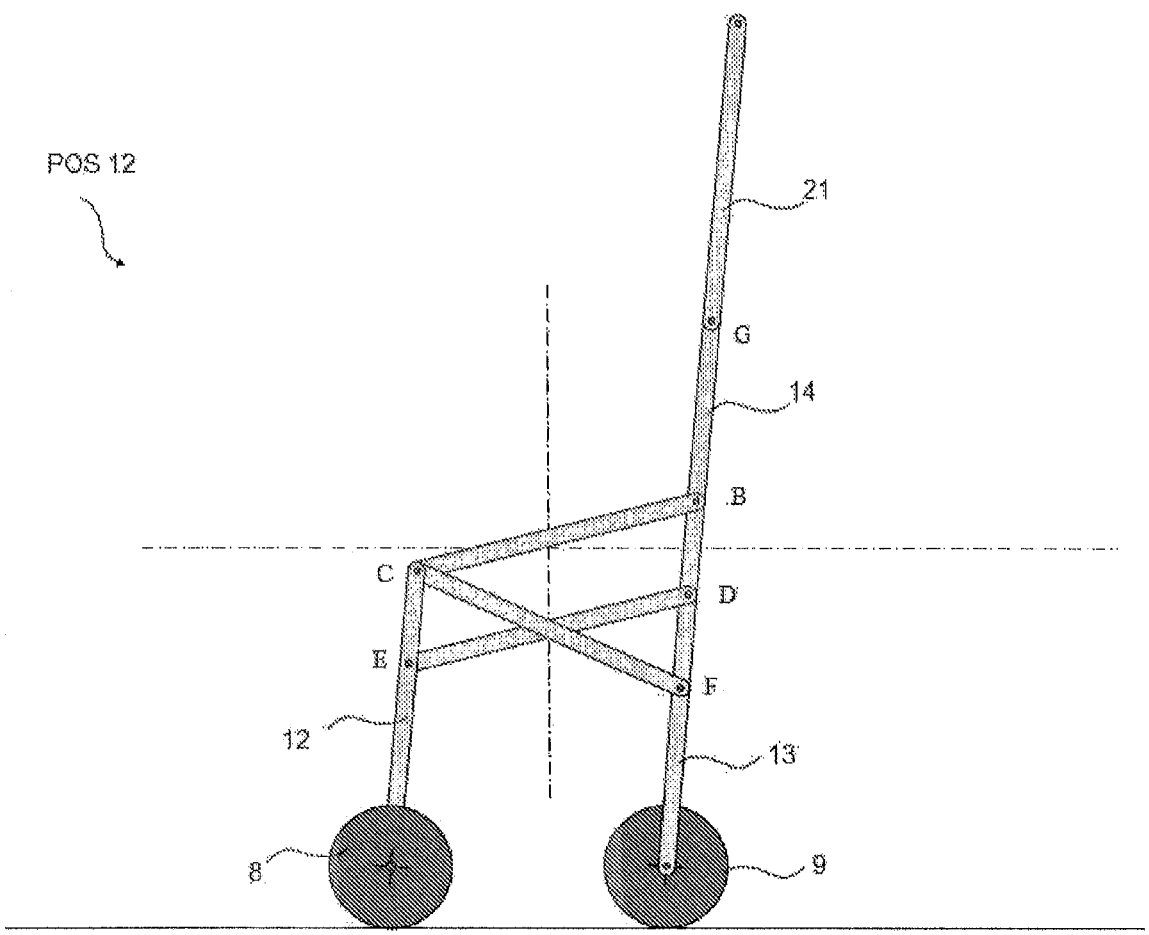
Figure 4C:
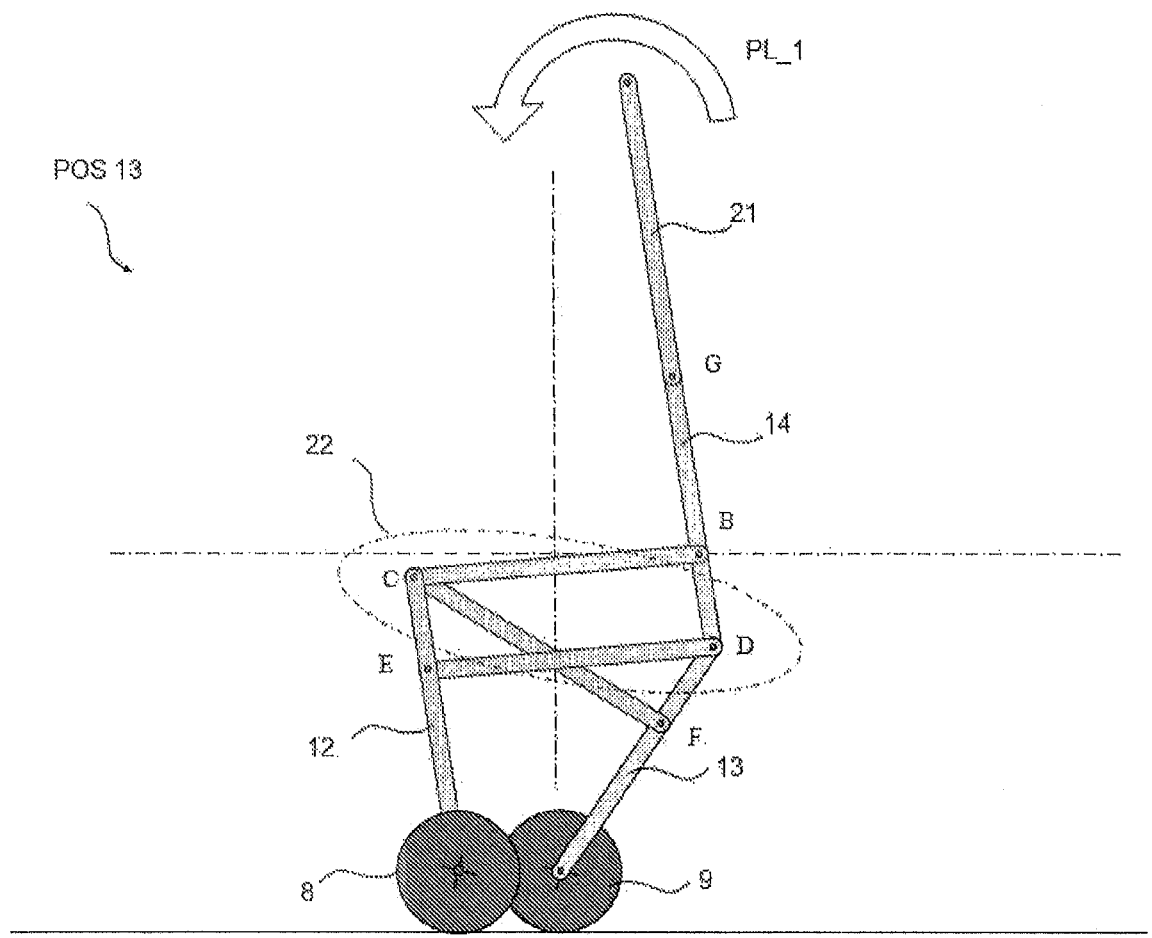
Figure 4D:
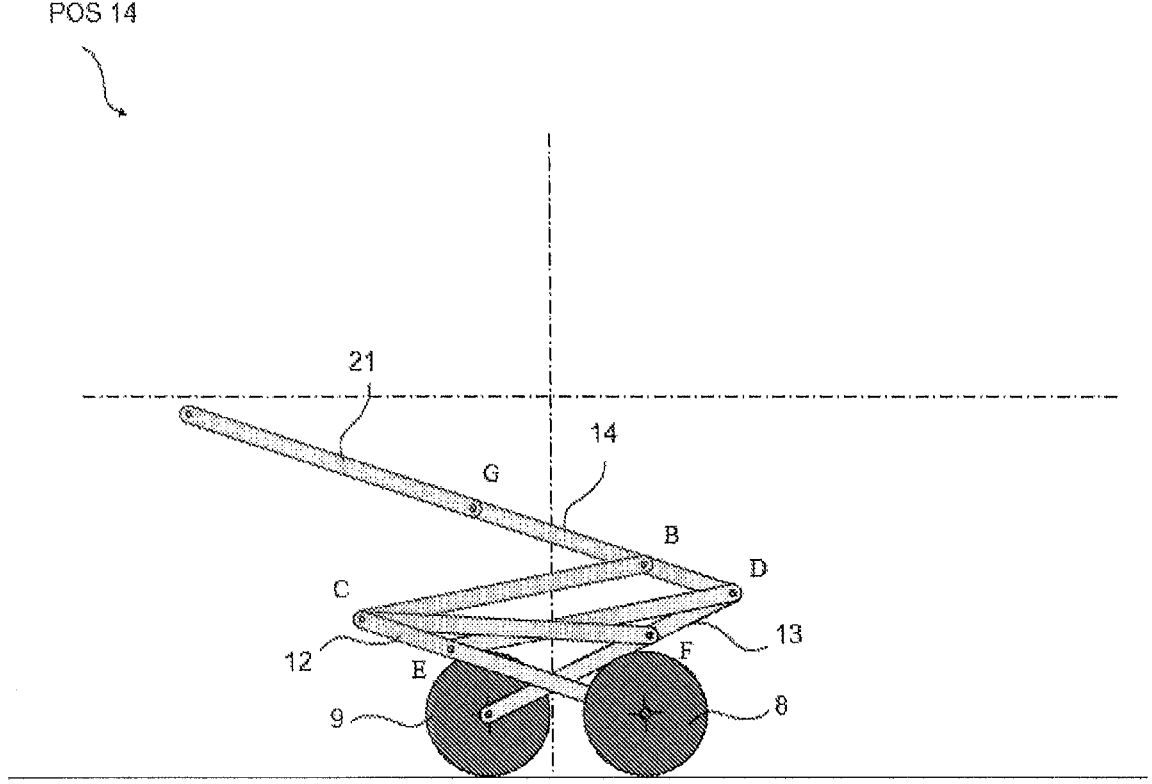
Figure 4E:
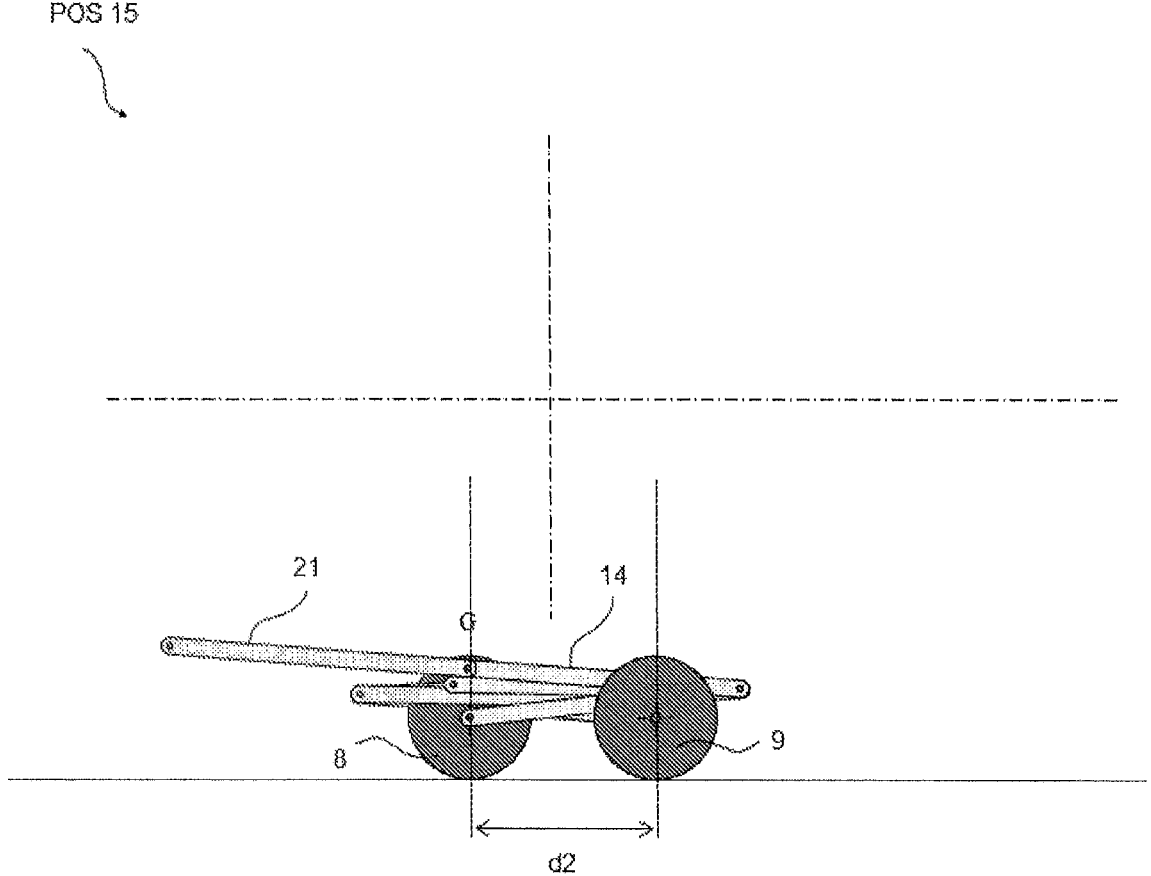
Figure 4F:
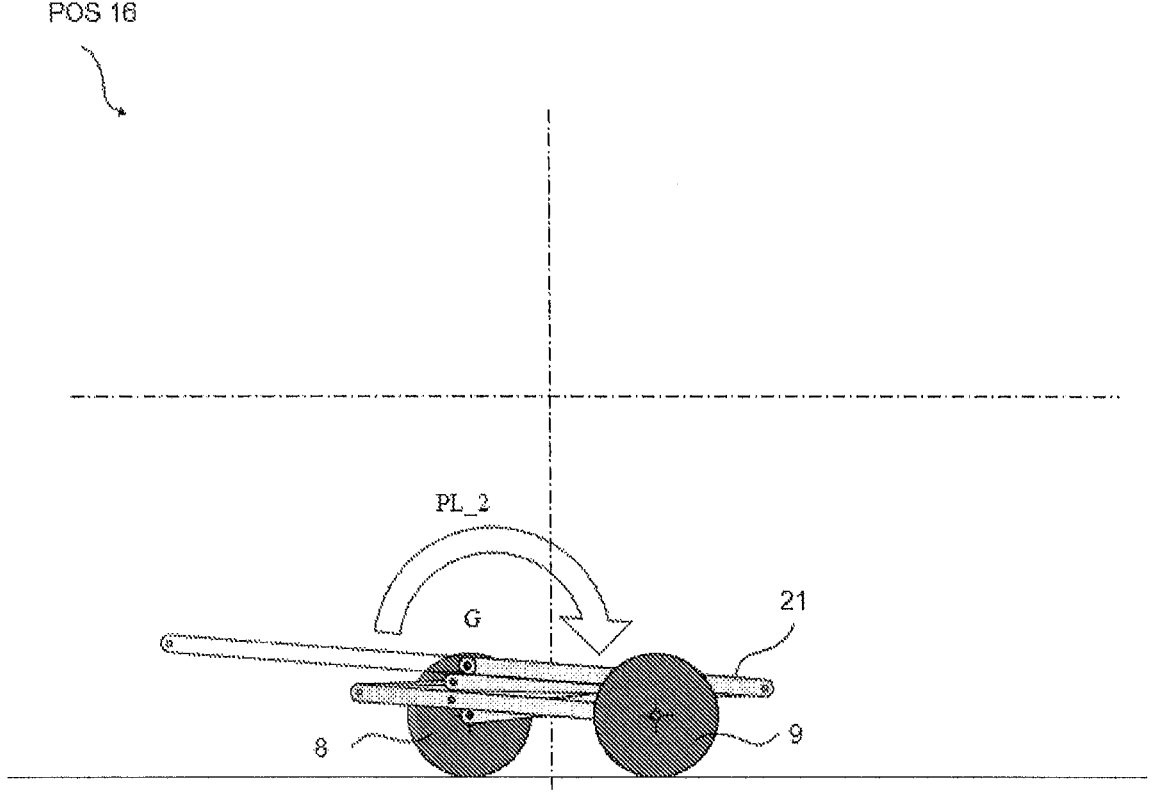

FIG. 4F shows a second folding movement when the junction between upper rear arms 14 and frame 21 is a pivot link around attachment point G. FIG. 4F shows an embodiment wherein a folding PL_2 allows to fold guide frame 21 substantially superimposed with rear upper arms which are themselves folded. The folding of the guide frame occurs in a reverse folding movement to folding movement PL_1 of the structure.

Figure 4G:
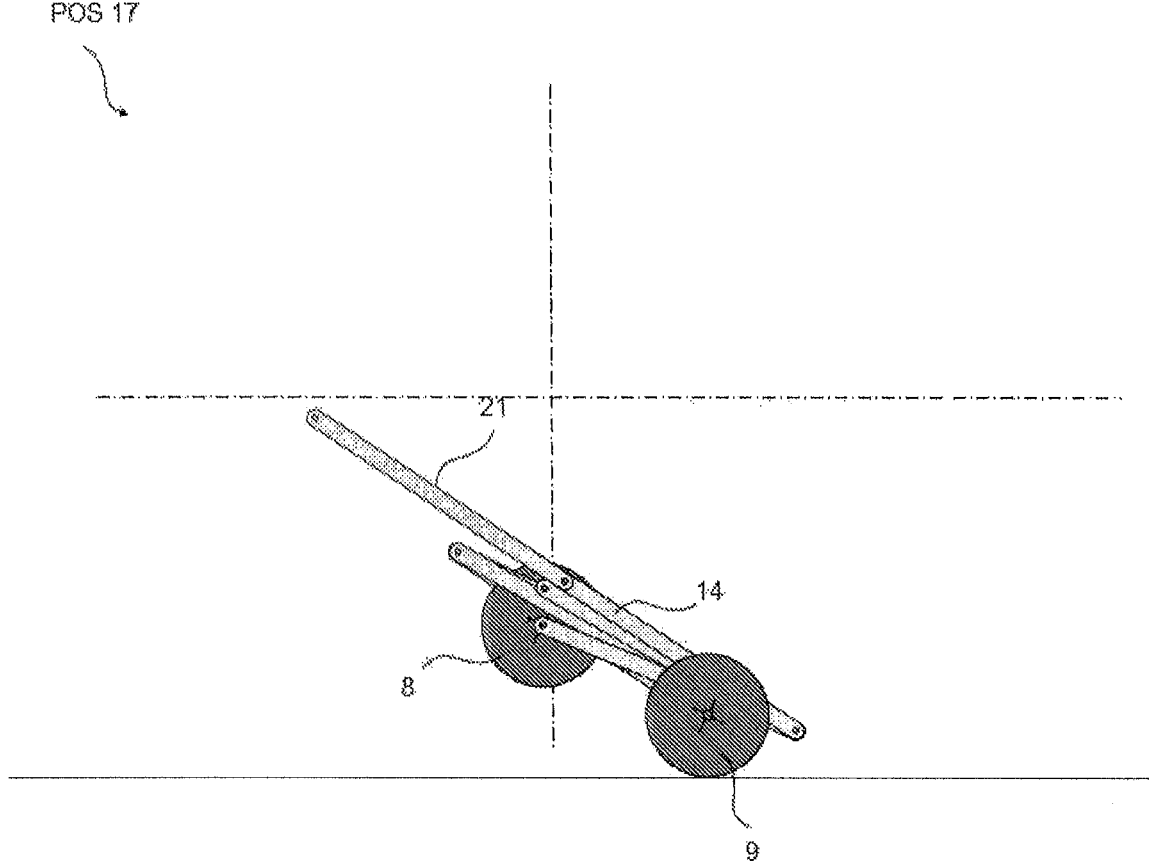

FIGS. 4F and 4G show a bearing structure in its most compact folded position.

FIG. 4A shows a wheelbase d1 corresponding to the distance between the front and rear wheels in the first position called the unfolded position.

FIG. 4E shows a reduced wheelbase d2 after folding, corresponding to the distance between the front and rear wheels in the second position called the folded position FIG. 4G shows an embodiment in which the stroller when folded can be drawn like a suitcase with wheels. In this mode the guide frame has a second function which is to allow to pull the stroller and to transport it by rolling it.

In a simple embodiment, the lower front and rear arms are attached to the two wheels. In a simple mode, the rear wheels are fixed and the front wheels swivel.

In an alternative embodiment, the stroller comprises holding means to lock the wheels in the longitudinal axis of the stroller, that is, in a direction of the length of said stroller.

In an alternative embodiment, the first unfolded position is slightly tilted as shown for example in FIG. 4A. This offers more comfort in guiding the stroller while allowing suitable tilting of the structure aimed at carrying a baby.

Alternatively, the adjustment means allow to choose and set the direction of the stroller including the tilt angle of the rear arm and the guide frame.

Alternatively, the stroller can be sized to be slightly tilted allowing to slightly raise the front of the stroller. For this it is possible to choose a lower front arm slightly longer (a few centimeters for example) than the lower rear arm.

In this device, the upper rear arm is the device control lever through its tilt angle. This requires the angle of rotation to be potentially adjustable in addition to safety positions folded/unfolded to enable more features. Depending on the embodiments, the locking of the tilting is done either laterally through a push button accessible from each side, or through a remote control positioned in the upper part.

One advantage of the device of the invention is that it has the characteristics of a haptic system which provides the user with force feedback during the folding/unfolding or when modifying the wheelbase:

- in fact, the operating modes of the drive are such that the user causes the folding/unfolding by manipulating the rear arms through a force and a torque obtained through his own hands;
- in return, the user gets a feedback of opposing forces and torque resistance transmitted via the antiparallelogram folding structure originating from the lower front and/or rear arms support points, at the user's convenience, in contact with the ground;
- Thus, the user is able to perform the folding and/or the unfolding in a controlled manner, if necessary by controlling the rotation with a precision of one degree, which is a great advantage in terms of ergonomics and the sense of security related to inadvertent unfolding or folding.

As a result, the support points contribute to ease the folding to the extent that the counter force produced by the resistance of the ground contributes to the movement or rotation of lateral folding device (s) after applying an effort on the rear arms.

More specifically, in an improved embodiment, the front and rear wheels are not positioned in the same longitudinal plane in order to intersect on each side during the fold.

Finally, it is possible to add a foldable compass on each side of the folding stroller, such as that of FIG. 1, between a point at the front, preferably the axis of rotation C, and the upper rear arm:

to lock in an open angle;

to find the usual strollers' disposition either at a functional level to secure interfaces that allow the exchange of the different stroller configurations as is already the case for the "trio" versions, or at an aesthetics level.

FIG. 4B shows a substantially vertical folding position of the stroller. This position elevates the stroller and reduces the wheelbase between the front and rear wheels. This can be an intermediate position which may be used in some configurations in which the maneuverability of the stroller is increased. This is best suited maneuvering in tight spaces, such as in a lift, an airplane corridor or in the middle of a crowd.

For security reasons this feature may be associated with the need for the user to maintain a button pressed (like for some trolleys).

Advantageously, the folding of the stroller can be done by keeping the wheels on the ground to ease first folding movement PL_1.

The structure of the invention is compatible with other systems such as strollers including at least one Maclaren type central cross to fold the stroller. To start a lateral folding when tilting the rear arms' plane forward, it is possible to implement a cross positioned in area 22 of FIG. 4C between points C and D, on each side of the stroller respectively. In the kinematics of the folding, centers of rotation C and D are in the exit phase and therefore induce an extension of the Maclaren type cross. Therefore, bringing the two sides together is possible through the use of a central cross.

One advantage is the ability to make existing strollers compatible with the folding device according to the invention.

One embodiment consists of adding a Maclaren type cross attached near points C and D, corresponding to the upper ends of antiparallelogram CDEF on one side and their folding device counterparts located on the other side of the structure. In order to attach a Maclaren type cross, bracket type or pivoting "U"s interface parts can be used.

In terms of design, when a Maclaren type cross is associated to the bearing structure of the invention, certain structural features can be customized, including:
the width of the bearing structure in the open position and the closed position;
the length of the open and closed cross, and the gap between both lengths
the maximum tilt angle corresponding to the open position;
the length of the longer sides of antiparallelograms ABCD and CDEF with CF=CB=DE the antiparallelogram link length
size of rods DF=BD=EC corresponding to the width of the antiparallelogram link
Length CD in the open and closed position, and the difference between the two calculated lengths, a consequence of the three preceding variables.

In order to improve the bearing structure of the invention when a Maclaren type cross is integrated, it is preferable to choose a variation in dimension CD in open and closed position corresponding to the length variation of the Maclaren type cross in open and closed position An example of embodiment of the invention can be made by assigning dimension CF a length of approximately 30 cm plus or minus 15%, a BD dimension of approximately 10 cm plus or minus 15% and the diagonal of the cross approximately 40 cm plus or minus 15%.

The exact dimensions mentioned above are the ideal ones to make a stroller, however, the margins given also make it possible to obtain satisfactory alternative embodiments.

The bearing structure of the invention may comprise a stiffening device in alternative embodiments, preferably placed at the rear of the bearing structure between the rear arms.

Their main function is to supplement or to improve the rigidity of the rear arms pivot links. This stiffening device keeps the two arms parallel at a constant maximum distance when the structure is kept unfolded.

The stiffening device can also contribute to the folding of the bearing structure as it contains a second folding device to make the structure more compact when folded.

This device increases the ease of use and simplifies the folding of the structure. It also keeps the structure in a folded position to prevent unwanted folding.

Various alternatives of the stiffening device exist, these are shown in FIGS. 5A to 5F.

First device 30 is an eight pivot-links only system as designed by Alfred Kempe, mathematically correct. It is structured with two pairs of isosceles quadrilaterals A0BE-OCGD and FAOC-HBOD whose short side is half the length of the long side and homothetic between them:
The lengths are such that:
A1E1=E1B1=C1G1=G1D1=1;
OA1=OB1=OC1=OD1=2;
F1A1=F1C1=H1B1=H1D1=4;
As a result, in the open position, points A1D1F1H1 make up a square making it a specific solution.

It is possible to obtain alternative solutions which allow for different types of the square.

Figure 5A:
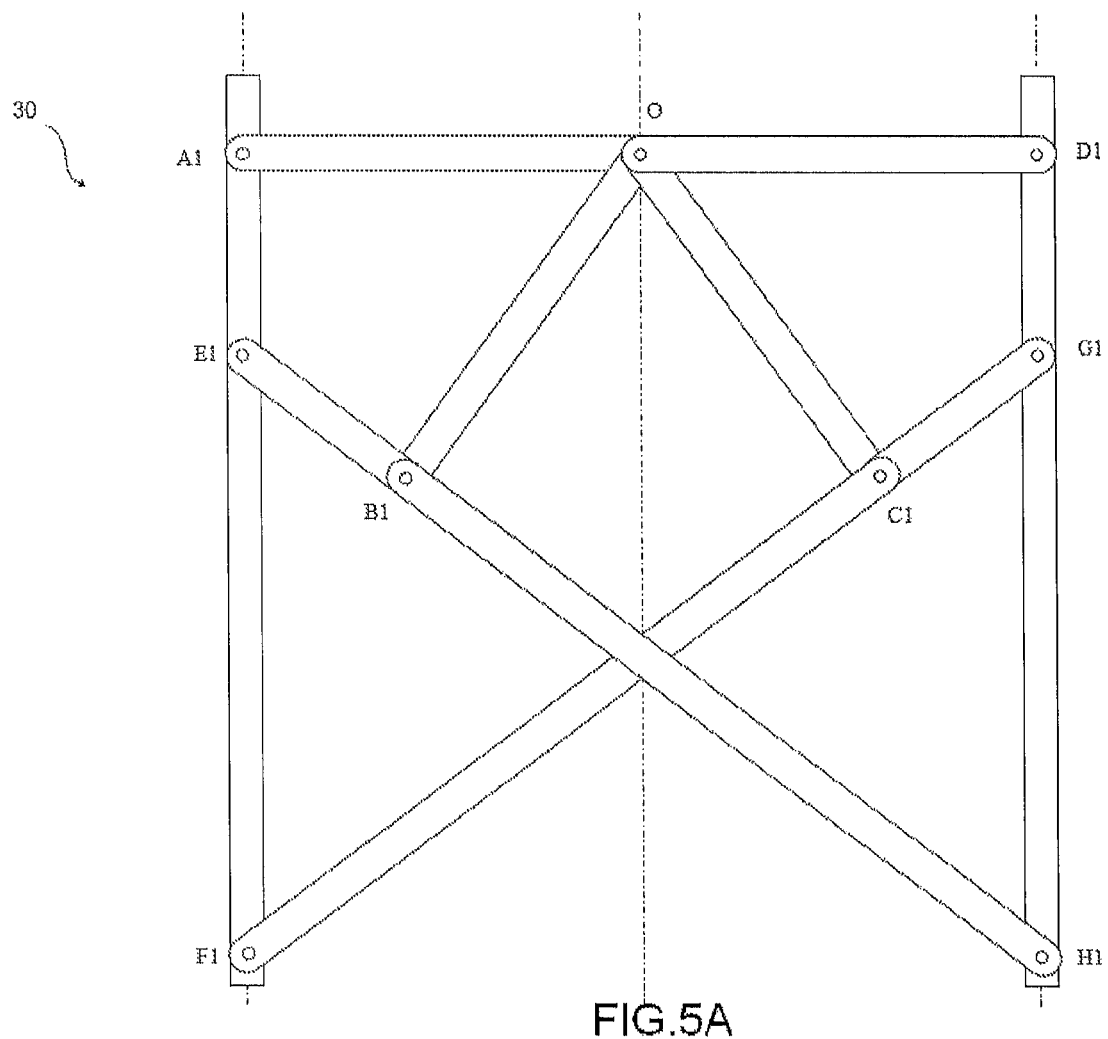
FIGS. 5A to 5F: various stiffening devices compliant with the structure of the invention.
Figure 5B:
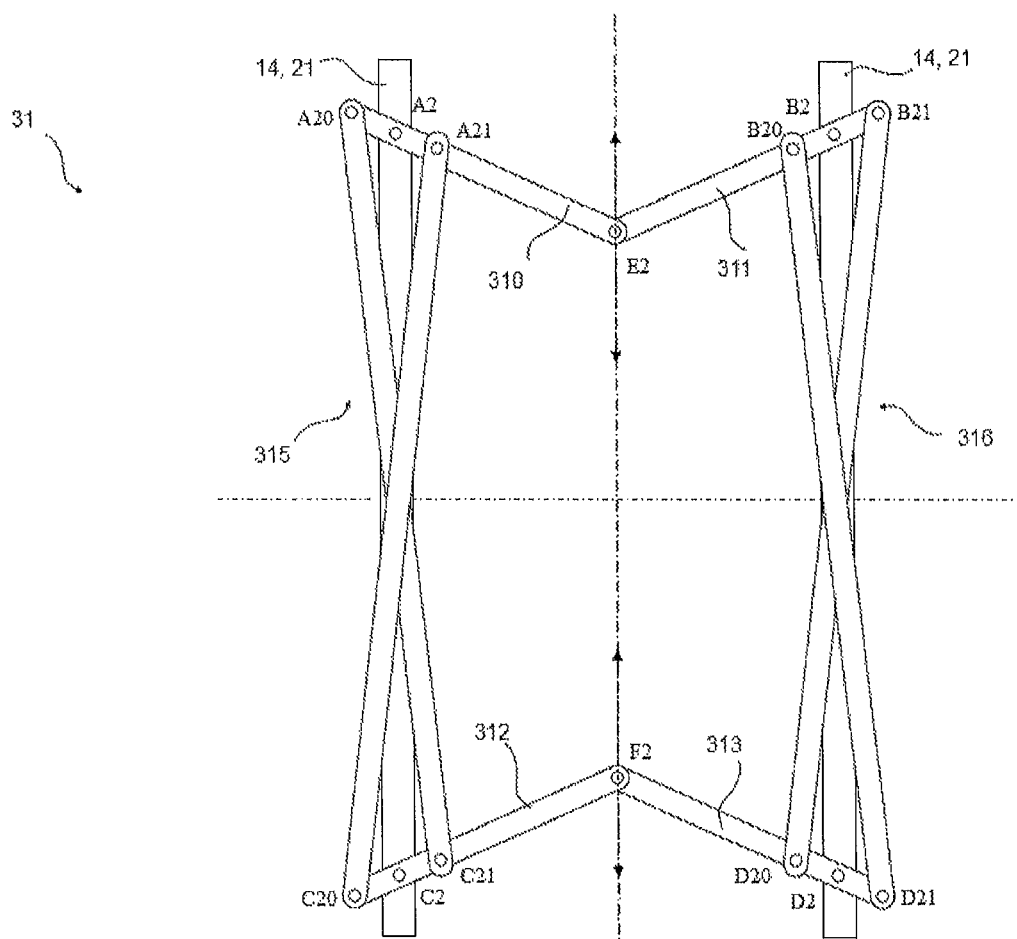

For example, stiffening device 31 may comprise a set of rods 310, 311, 312, 313 fixed to rear upper arms 14 and 21 by pivot links A2, B2, C2, D2. The stiffening device may fold as shown in FIG. 5B, within the perimeter of said stiffening device when in a folding position. To engage the folding of the stiffening device, pivot links E2 and F2 allow the upper rear arms to come closer together and decrease the width of the bearing structure.

In order to synchronize folding of the first set of upper rods 310, 311 and the second set of rods 312, 313, antiparallelograms 315 and 316 (denoted by their ends A20A21C20C21 and B20B21D20D21) may be arranged so as to connect the sets of upper lower rods.

In this device (31), the two rods 310 and 311 which form a first compass and the two rods 312 and 313 which form a second compass operate in opposition and their rotations are synchronized by two antiparallelograms 315 and 316. Rear arms 14 or their extension 21, for which the parallelism is to be synchronized, are linked by points of rotations which are located in the middle of antiparallelograms 315 and 316's small sides, which is an approximation:
It is the difference in length between the long side of the antiparallelogram in the closed position and the hypotenuse which would be the length in the open position
in FIG. 5B, each antiparallelogram 315, 316 include proportions with a ratio of about 1 to 7 These proportions allow a difference of 1% between the two values; the hypotenuse of a right triangle with a base of 1 and a height of one seventh has a value of the square root of 1+1/49=1+2% equal to 1+1% times the base An alternative embodiment of this mode is shown in FIG. 5C in which a stiffening device 32 includes four antiparallelograms 323, 324, 321, 322 substantially in the plane formed by the upper rear arms 14 or their extension 21.

It is possible to make the device foldable strictly within the perimeter of the open structure formed by the perimeter of the stiffening device.

Figure 5C:
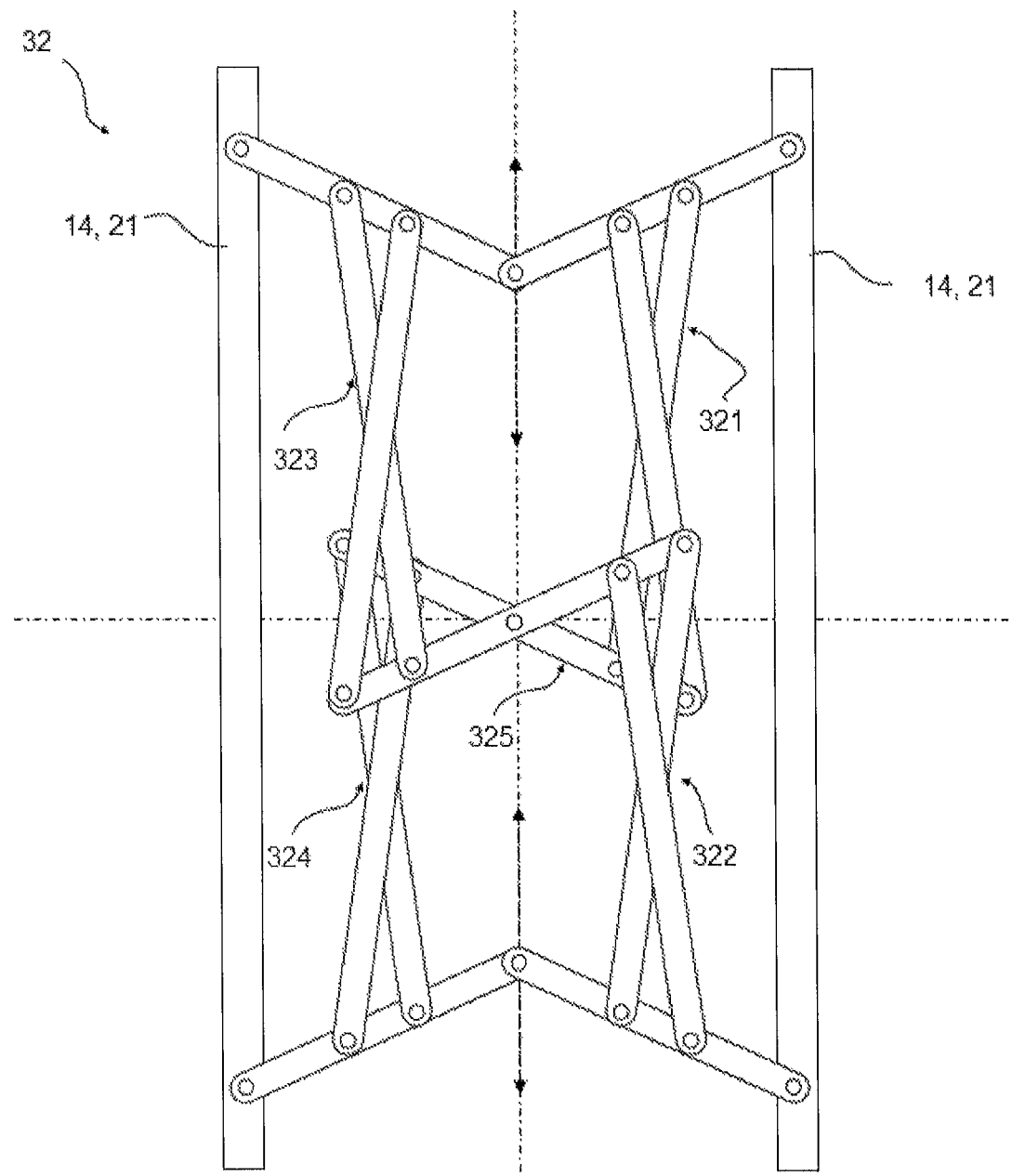

This embodiment (32) comprises a central cross (325) for which the branches are connected by antiparallelograms at half the scale of the previous antiparallelograms, that is to say those in FIG. 5C.

This cross ensures the synchronization propagation of the rotation of the entire stiffening device.

In an enhanced mode, it is preferable to maintain a spacing of a few centimeters between the folding links.

Figure 5D:
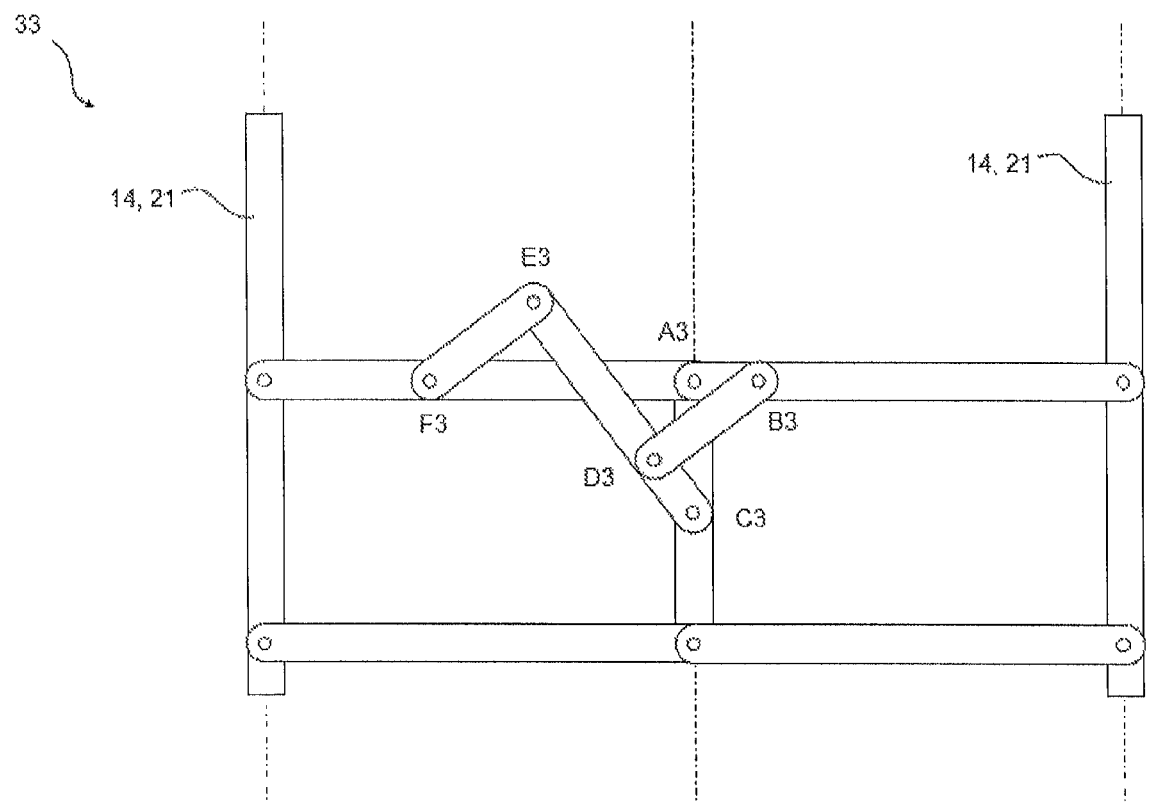

A second type of solution is shown in FIG. 5D. It comprises the combination of two identical deformable parallelograms for which the folding/refolding synchronization must be ensured. One solution is to use a "bisector" from the Alfred Kempe "trisector" based on two antiparallelograms one of which (A3C3E3F3) is double the size of the other (A3B3C3D3):

Note that the proportions are as follows in order to obtain a folding and maintaining the proper structure: A3B3=C3D3=1, A3B3=A3C3=E3F3=2, C3E3=0.4

This eight link device only based on pivots is mathematically accurate and can also operate in reduced space.

Figure 5E:
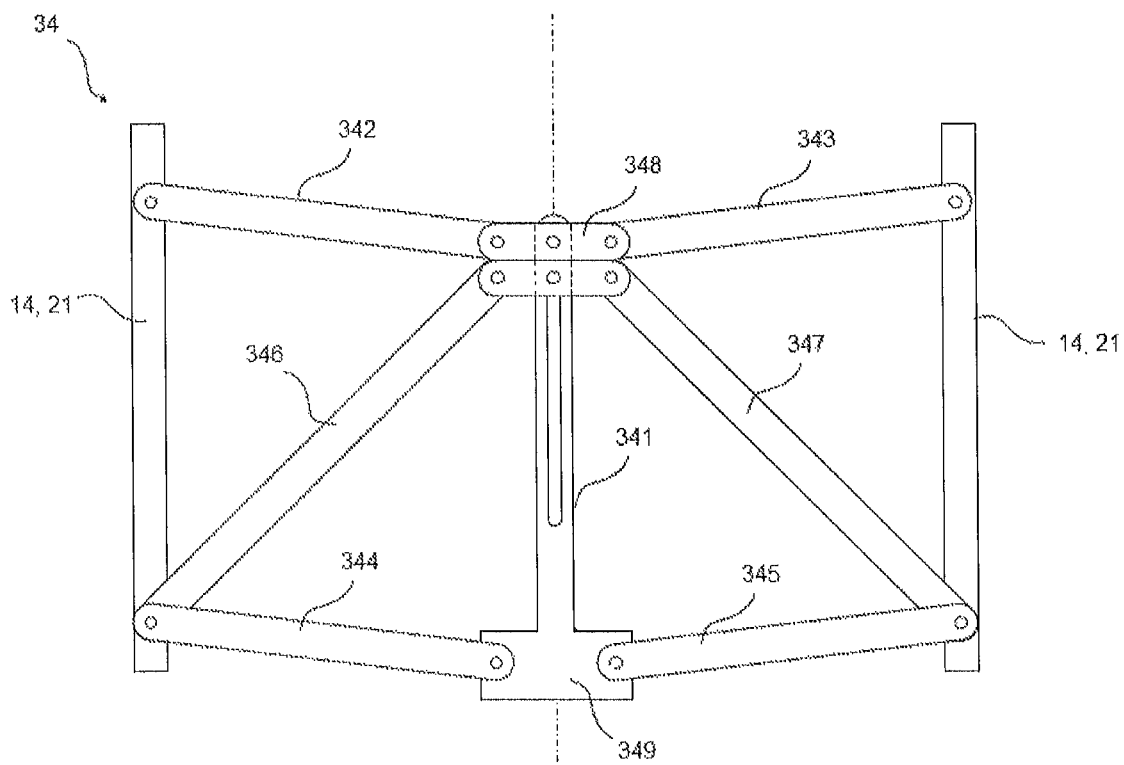

In another embodiment, the stiffening device may comprise a dual articulation system so as to maintain the symmetry of the two parallelograms. For example, a system comprising a sector gear as in a school compass or a plurality of connections can be used. FIG. 5E shows a system with seven links, 342, 343 (344, 345, 341, 346, 347. Link 341 comprises a groove to allow the passage of a sliding connection and an end 348 for the attachment of two pivot links. Two sets of dual links 342, 343 on the one hand and 346 347 on the other are sliding by means of a double sliding link 348 as shown in FIG. 5E. This embodiment is compatible with the bearing structure in accordance with the invention.

Note that it is common for the breakpoint to cross the points alignment line to create a "toggle" effect.

Figure 5F:
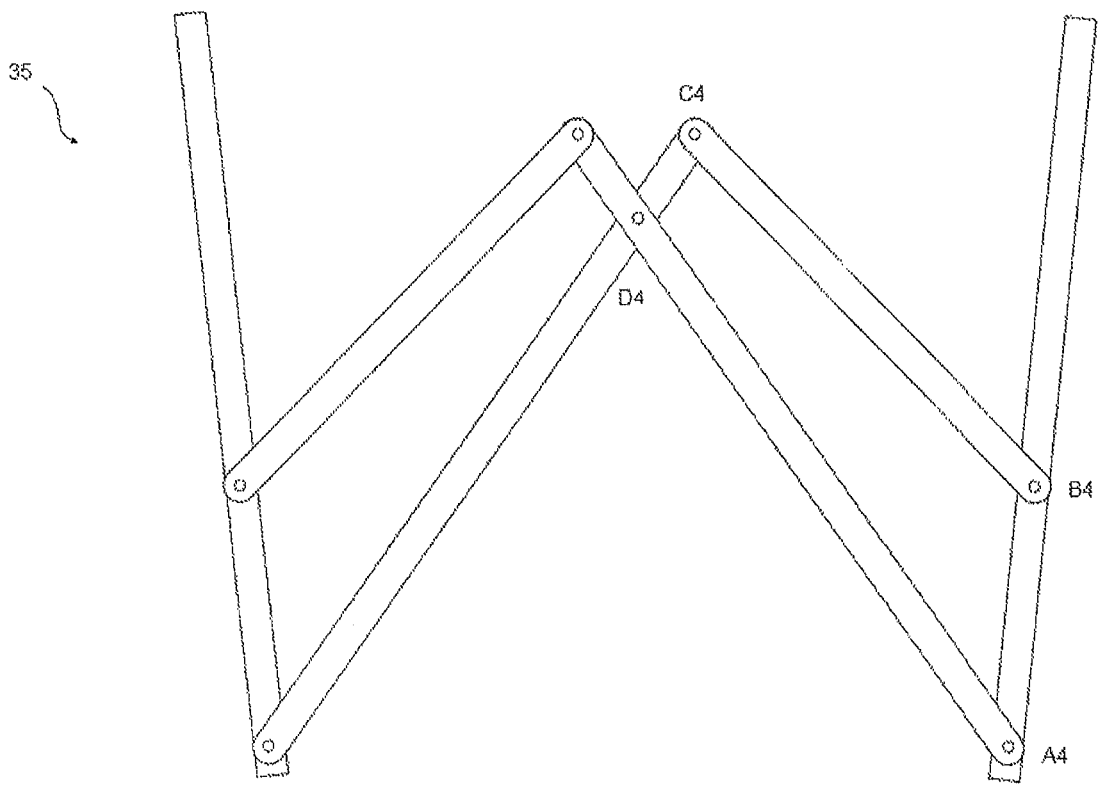

It is also possible to be satisfied with a four links solution which remains an approximation as shown in FIG. 5F.

In the example of FIG. 5F, it is necessary that the amounts A4D4+B4C4 and A4B4+D4C4 be identical. The parallelism varies of several degrees as the opening widens.

Finally, it is also possible to use a cross for which two ends are pivots and two others are slidable.

With this set of solutions from FIGS. 5A to 5F as well as their variants which aren't shown, it is possible to stiffen all or part of the pairs of arms:
  the pair of upper arms 14;
  the pair of guide arms 21 which extend upper arms 14;
  the pair of lower rear arms 13 which bear rear wheels 9
  the pair of lower front arms which bear front wheels 12.

In the event that several pairs of arms are stiffened by dedicated devices, a question needs to be asked regarding the use of their synchronizations and their locking/unlocking.

To this end, some embodiments may be suggested to improve the stiffening device's and folding devices' synchronization mechanism. A particularly advantageous area for accommodating a folding propagation device is near the area the (DD') segment. Indeed, the central segment of axis of rotation (DD') is shared by the rear part of the bearing structure housing the stiffening device, and by the side parts each comprising a folding device 20.

D is a vertex of the antiparallelogram of the folding device located at the rear of the bearing structure and located on one side of the structure. D' is its counterpart on the other side of the bearing structure.

The central segment DD' is common:
  to the rotation of the plane of the rear upper arms;
  to the rotation of the plane of the Maclaren type cross;
  to the rotation of the plane of the rear lower arms;
  to the rotation of the plane of a pair of links ED and ED' which are part of the antiparallelograms.

E' being the counterpart point to point E located on the other side of the bearing structure.

This segment can be materialized as a hinge for which its axis is coincides with axis DD', placed in its centre, linking two plates, one of which is in the Maclaren type cross plane and the other in the plane of the upper arms.

Figure 6A:
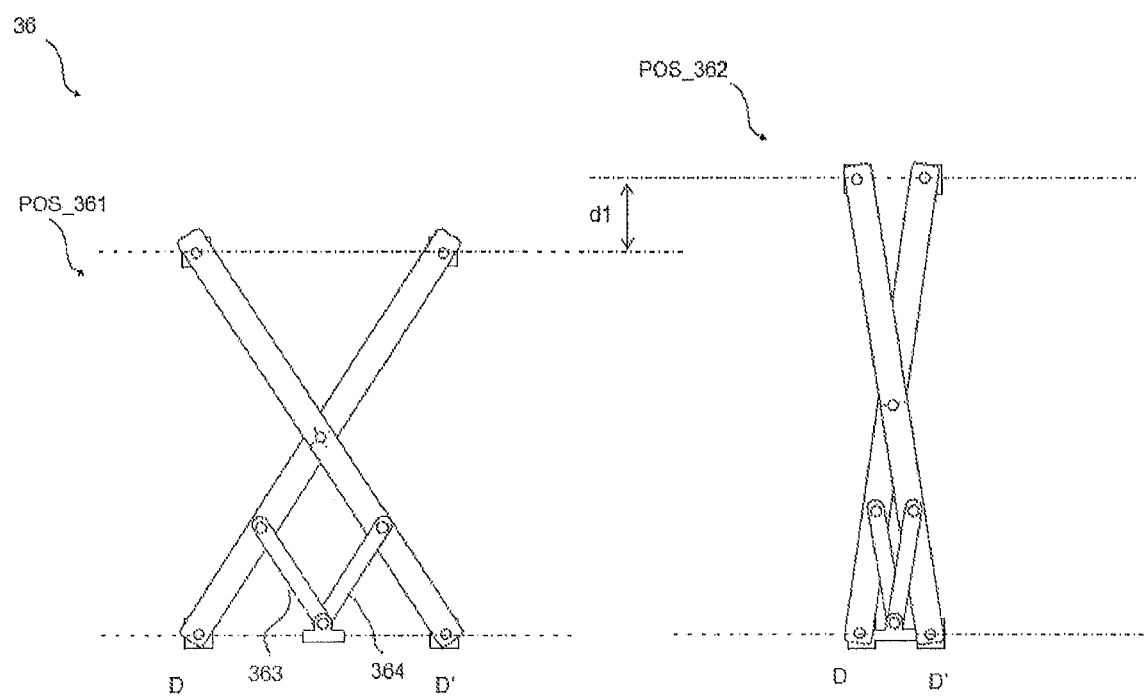
FIGS. 6A to 6D: various propagation devices used to synchronize the folding of a stiffening device with a central folding device, compliant with the structure of the invention.

FIG. 6A shows a Maclaren type cross in the horizontal plane. In this cross's plane, in the middle of the cross's rear arms, two links 363 and 364 need to be added. Those links have a length corresponding to half the arms' length, and will meet up in the middle of axis DD' may it be in open, intermediate or closed position.

FIG. 6A also shows the width difference (d1) between an opening or unfolding positionPOS_361 and a closing or folding position POS_362.

In the plane of the rear arms, assuming we adopted the classic double articulation system with sliding movements described in FIG. 5E, we must also create two additional links with a second dedicated slide connected to the corresponding plate.

Figure 6B:
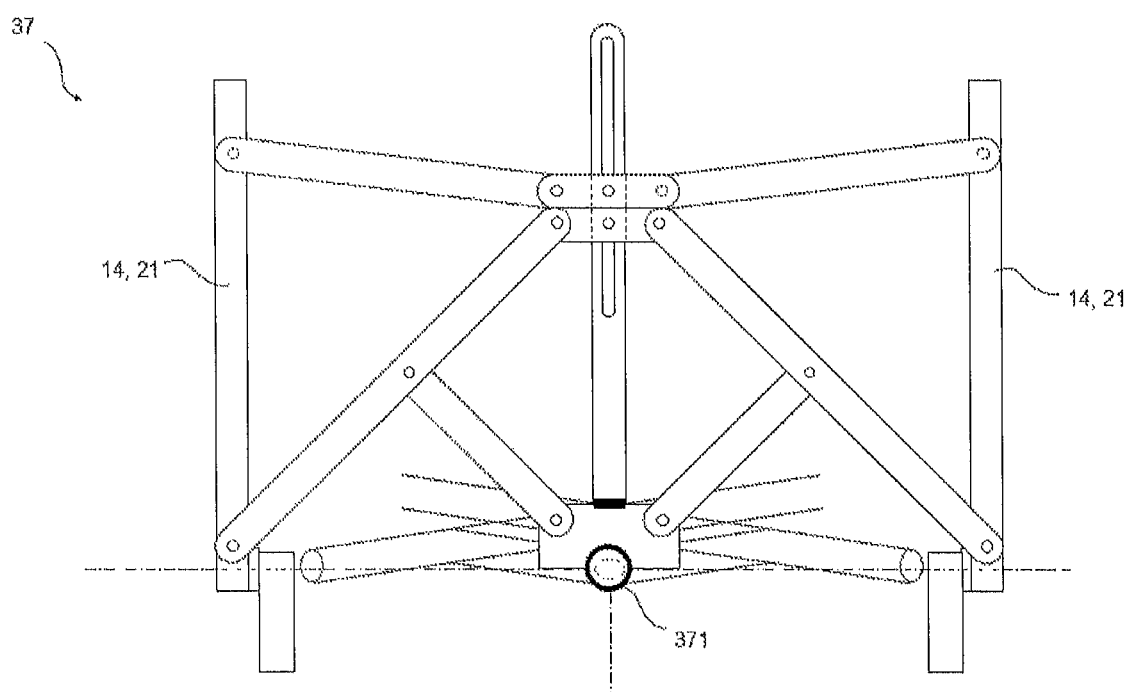

FIG. 6B shows a propagation device 37 which includes a dual-hinge system with sliding motion that is superimposed on system 34 described FIG. 5E.

This device provides a physical point 371 in the middle of the bearing structure's rear arms axis of rotation.

The stiffening device can be used to stiffen the bearing structure with additional mechanical links.

Advantageously, the stiffening device comprises a portion for the propagation of the synchronization movements for the folding of the structure. A propagation device can synchronize all or part of the devices added to maintain the parallelism of the pairs of arms 14, 21.

In particular; it has become possible to create a crossing point for one or more cables in the form of a ring or a pulley and to link the devices responsible for maintaining the parallelism of the upper and lower arms.

Figure 6C:
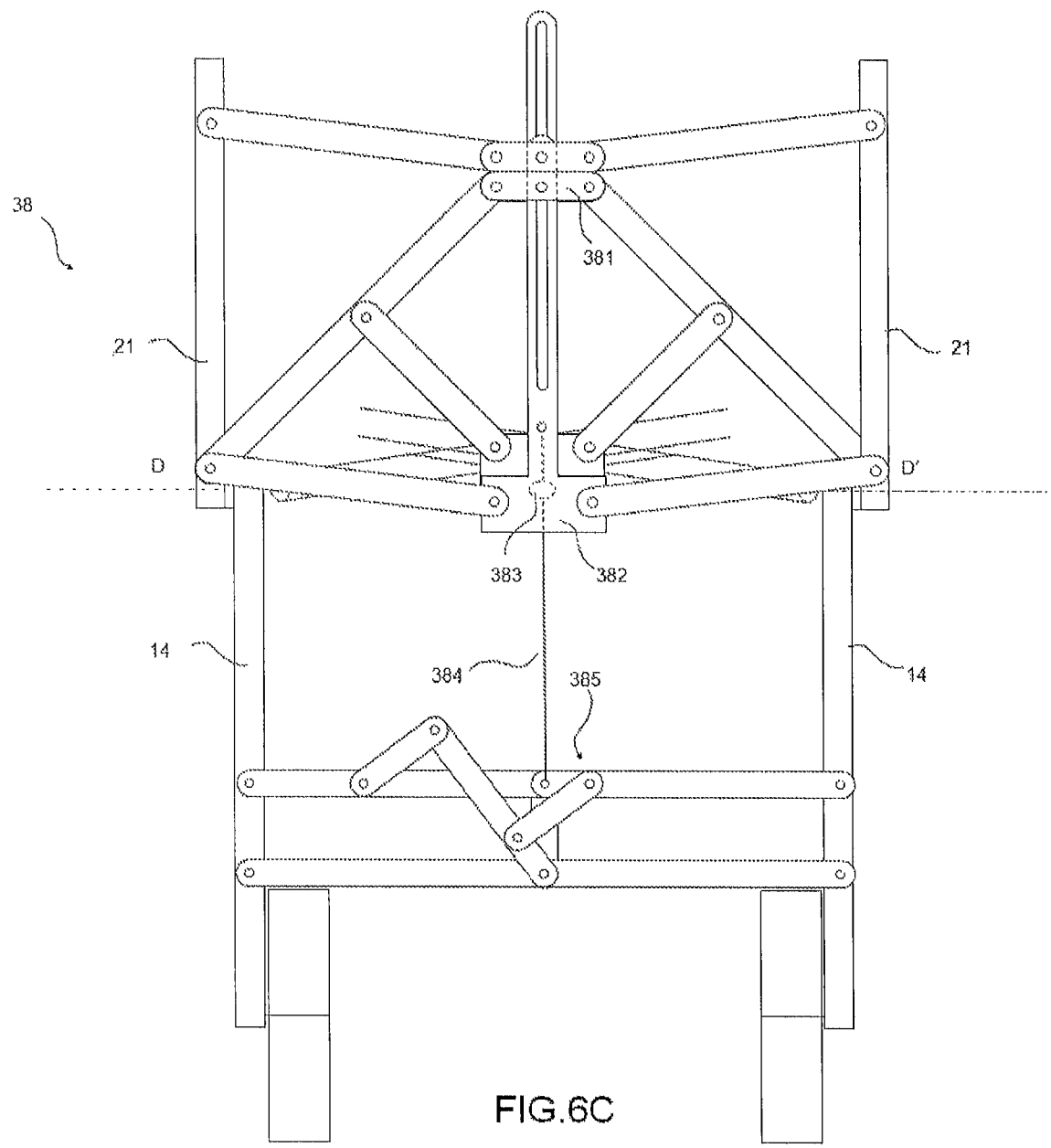

FIG. 6C shows such an embodiment. The stiffening device includes a slider connection to activate a one hand pulling motion on the upper part and to unlock and start the unfolding of the stiffening device.

A ring or pulley 383 substantially in the middle of axis DD' allows a cable or a strap connection 384 to come through. The ring or the pulley is held by means of a central link 382 which connects the various link rods through pivot links.

By connecting the slide of the upper arms' device to the central point of the lower rear arms' device through a cable or a strap passing through the middle of DD' either through a ring or a pulley:
  Pulling manually on the upper part of the upper arms device, in particular to unlock and/or fold it, will also result in a traction on the lower arms device to unlock and/or fold it.
  Pushing lower part 385 of the lower arms device with the user's foot made by of the user's foot on the lower part 385 of the lower arm device, in particular to finish unfolding and/or unlocking it, will result in downward pull of the slider of the upper arms device to finish the unfolding and/or locking.

In an enhanced mode, the previous embodiments of the bearing structure may comprise a front folding device which is installed in the lower front arms' plane, front lower arm 12 and its counterpart front lower arm 12' on opposite side of the bearing structure.

To reduce the size at the front of the bearing structure, for example, when the bearing structure is a stroller, the folding and the stiffening of the front arms' parallelism may comprise various embodiments that may be combined:

- upper pivots points C and C' are directly guided by the front ends of the Maclaren type cross (C' is the counterpart point to point C on the other side of the bearing structure);
- pivot points E and E' can be guided by a device similar to the rear lower arms but in plane EE'DD' which has the advantage of also intersecting axis DD' and benefit from a similar system to the rear arms through synchronization by a second cable going through the same place or almost same place, via a ring or a pulley and potentially pooled together;
- Since the user mostly manipulates the rear of the bearing structure and not the front, for example, when the structure is a stroller, a local return spring should be added to ensure the local final unfolding of the device dedicated to the front.

Alternatively, a solution comprises a central folding device of a bearing structure in the horizontal plane comprising antiparallelograms.

Figure 6D:
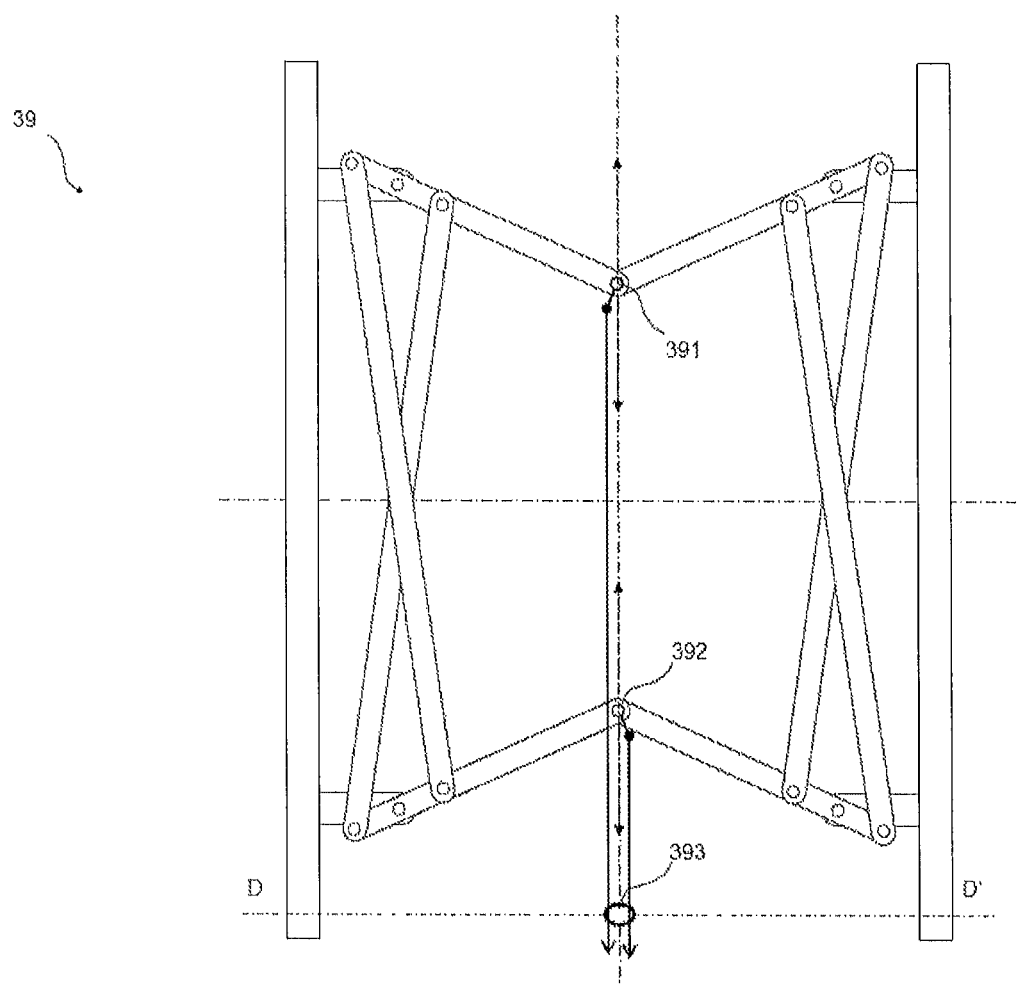

FIG. 6D shows a central folding device in the horizontal plane of comprising a folding movement propagation device.

It is then possible to connect front central point 391 by a cable or a strap through midpoint DD' to the top central point of the stiffening device, point 383 of FIG. 6C in the upper arms (14, 21) plane. The user can manually pull back the upper part of the upper arms stiffening device. It is then possible to unlock and/or fold by pulling back on front central point 391 to also unlock it and/or fold the bearing structure.

It is then possible to connect the central rear point by a cable or a strap through midpoint DD' of the apparatus at the central point of the lower rear arms. A push the user's foot on the lower part of the lower arms device, in particular to finish the unfolding unlocks the structure. It can be initiated by a backward pull on central rear point 392 which, via the action of antiparallelograms, will result in a forward thrust towards front center point 391 to finish unfolding and/or locking.

In an alternative embodiment, it is possible to make the width folding device disengageable, for example to keep an accessory on the bearing structure which does not fold on its width. For this, it is possible to make the arms of the central cross extendable through a locking/unlocking mechanism depending on whether width folding needs to be activated or not.

The bearing structure may include various applications including a stroller with four wheels. It can also be a three-wheeled stroller by combining a pair of arms connected to the ground by either twin wheels, or a single wheel.

Figure 7:
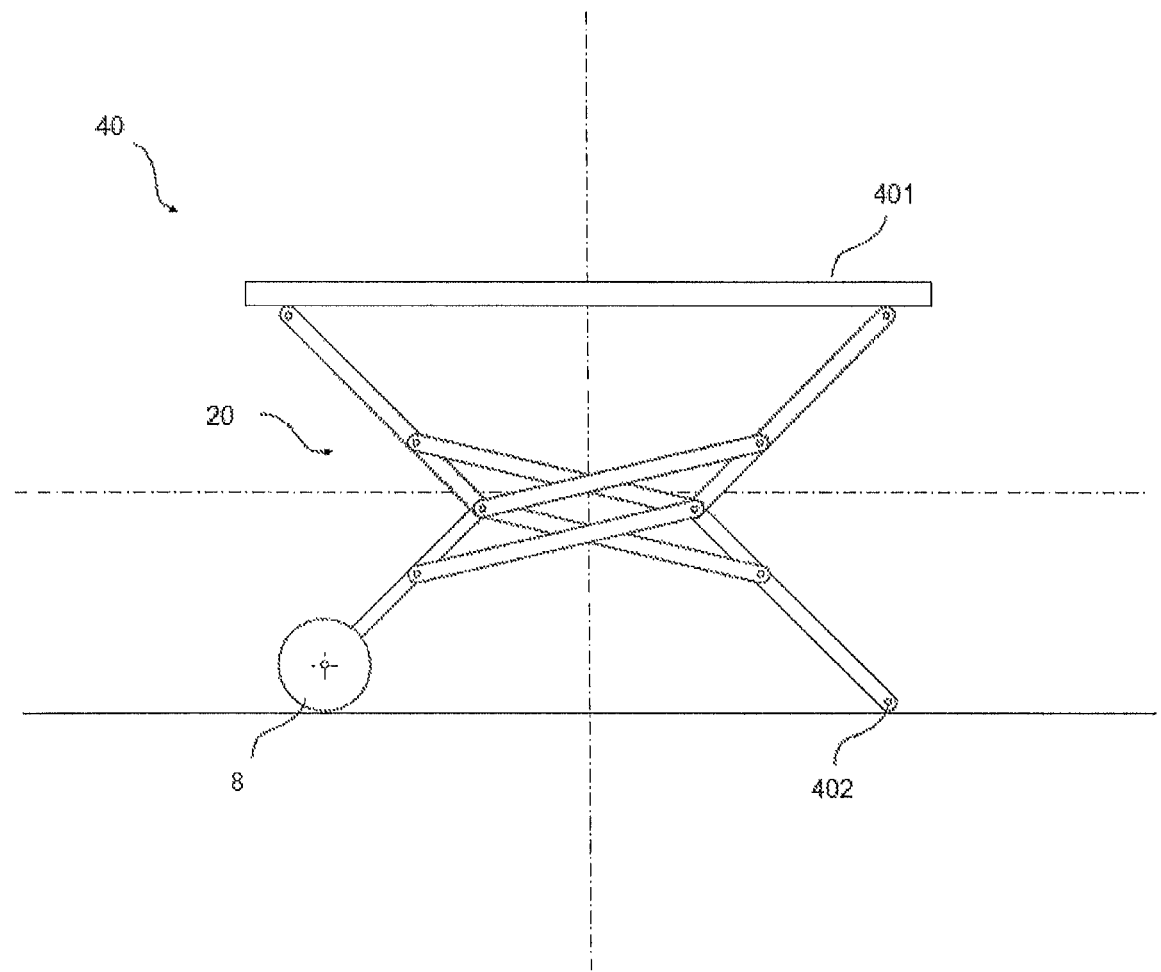
FIG. 7: a foldable table comprising a bearing structure of the invention.
Figure 8:
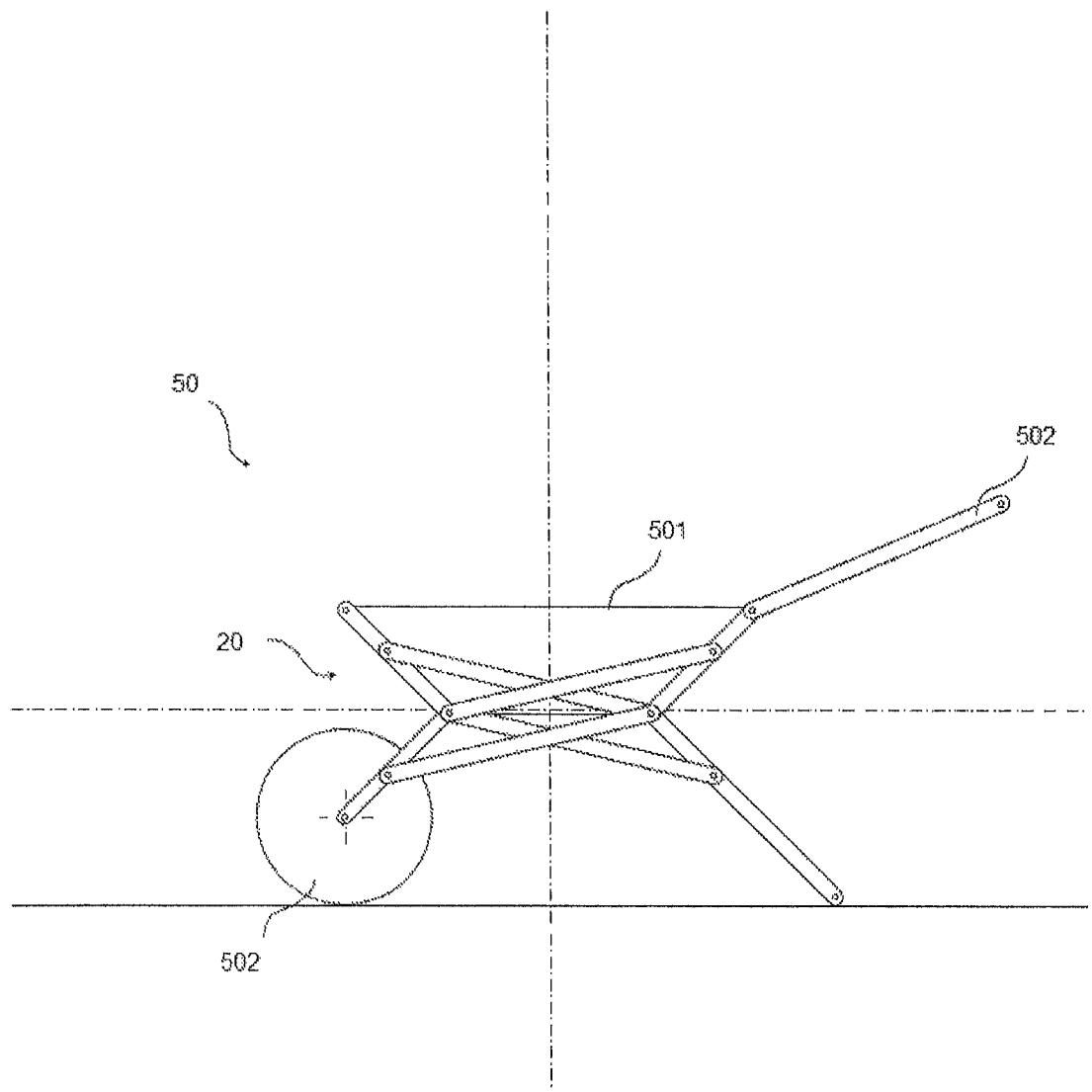
FIG. 8: a foldable wheelbarrow comprising a load-bearing structure of the invention.

One application may comprise a pair of lower arms in contact with the ground through at least a pair of wheels. This is for example the case of a table (40) as shown in FIG. 7. The latter includes two folding devices located on both sides of the structure. These devices each include upper front arms and an associated sidebar. Only the front part comprises wheels (8) and the rear part comprises one or more contact points (402) with the ground. The table comprises a removable tray 401 and/or foldable maintained in a substantially horizontal plane by the upper front and rear arms.

This may relate to other applications in the field of childcare, but also for camping equipment, foldable garden furniture, spare furniture, handling equipment.

For example, the invention relates to a foldable wheelbarrow (50) comprising a removable and/or foldable bin 501. An extension arm (502) is connected to upper arm 14. A large wheel, appropriate for use on terrain such as fields, and muddy soil is connected to the lower front arm (s).

In an alternative embodiment, the bearing structure is a foldable chair. The foldable chair of the invention saves space when it is folded. In particular, folding allows a reduction in the width of the chair and a reduction in length when folded as The upper rear arms are also foldable, once folded, the chair of the invention is compact and can easily be moved and stored in a small space such as a locker room, or a storage compartment on a train or an airplane.

In an alternative embodiment of the invention, the bearing structure is a foldable stool that does not include upper front or rear arms. The stool is folded so as to reduce its length, that is to say, its wheelbase as defined in the previous description (distance between the lower front and rear arms) and also reduce its width through the central folding system.

According to these two embodiments, and the one for stroller or trolley, a support surface may be positioned in zone 22 of FIG. 4C. The support may be a loose fabric, for example attached to the upper ends of the lower arms in the case of a stool, that is to say, on points C and D and the points associated to the second side of the bearing structure.

Figure 9:
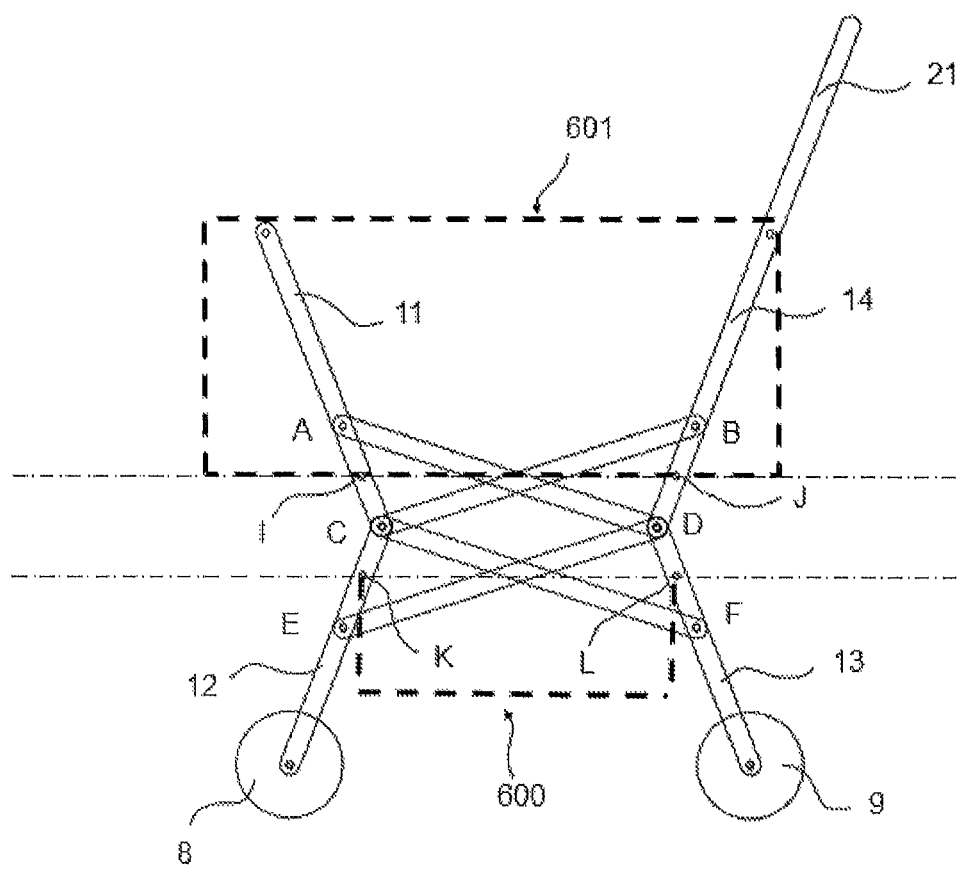
FIG. 9: a collapsible trolley comprising a bearing structure of the invention.

FIG. 9 shows an embodiment of the invention applied to the case of the trolley. As before, FIG. 9 only shows one side of the trolley or pram. A second side in a plane parallel to the one shown would lead to a non visible 3D view of the trolley. A basket or support is defined as an object attached to the foldable bearing structure, comprising two sides as shown on FIG. 9.

Due to the presence of the lower arms antiparallelogram CEDF we already have two particular points K and L in the middle of the two shorter sides of the EC and DF antiparallelogram, for which the distance remains substantially the same in all folding positions. Therefore these points provide preferred support points for coupling objects to the foldable bearing structure when considering the points from the second side in a plane parallel to the side shown in FIG. 9.

By having the upper rear arms facing the upper front arms, there are two particular points I and J in the middle of the two shorter sides AC and BD of the antiparallelograms for which the distance remains substantially the same in all the folding positions. These points are also interesting to attach an object to the foldable structure by considering the points associated to a second side within a plane parallel to the structure shown in FIG. 9.

For example, for a changing table, the table support being attached to points I and J, we can attach a baby bath just below, in the plane including points K and L while considering the points associated with the second side parallel to the first side.

In the case of a pram, upper points I and J can be used and the points associated with the second side to attach the pram carry-cot and lower points K, L and associated points from the second side to hang a basket.

In the case of a multi-use version, these points can be used to attach a rod extending longitudinally linking them together. Interfaces that are used to change various configurations as is already the case in the "trio" versions. A 4-arm "trio" version can be designed to be compatible with these different configurations. Trios versions allow you to attach different types of supports such as a cozy, a pram, a seat or a car seat. The interfaces allow supports to be clipped on, including on a substantially horizontal level comprising points I, J and counterpart points from the second side. There are at least two interfaces present in such a system: one on each side.

In the case of trolleys, either handling trolley or shopping trolley, either possibility can be used.

For a handling trolley, a removable container, also foldable in width, can be used. In the case of a shopping trolley, a basket with the same folding mode can be used. It is conceivable in this case that the upper arms take part in the unfolding of the container by putting it in extension.

Due to the presence of a central folding system, the preferred solution to obtain a larger volume is to use the pair of attachment points I, J of upper antiparallelogram ACDB, which positions support 601 to be coupled, above the central folding system. The central folding system being arranged in an area substantially within the plane of points C, D and respective points of the second side.

The lower binding pair K, L may help it hang a tray or a lower basket as shown by dotted lines 600.

The folding/unfolding system may present an interest in transportation logistics to reduce package sizes during transport, regardless of the operation which would be made by the end user. For example the system could be used to fold individually very bulky shopping trolleys from the factory, and to unfold them upon receipt with or without additional operations.

Furthermore, the system can be powered using an electric actuator. For example, it may be:
  positioned in the central folding system to move points C,D away from each other or bring them closer together, for example, a rotary actuator on the center cross
  positioned on the rear double compass, as a linear actuator to separate or bring double compass upper point and fixed point 382 (created in the middle of axis DD' visible in FIG. 6B or 6C) closer together.

In this context of motorization, the synchronization of the different devices on the different planes is all the more relevant in particular to help with or perform the locking, unlocking, opening or closing phases of the folding device of the invention.

The invention claimed is:

1. A folding bearing structure comprising:
  a set of coplanar support points including at least two rear support points and at least one front support point;
  at least two folding devices each comprising
    a set of lower arms comprising at least one front lower arm and rear lower arm each comprising a first end, each being connected to one of the support points;
    an antiparallelogram deformable in a vertical plane, said antiparallelogram comprising two crossed segments with:
      a first end and a second end each being fixed by a first and a second attachment to a first end of the front lower arm and a first end of the rear lower arm respectively;
      a third end and a fourth end each being fixed by a third and a fourth attachment to a first point on the front lower arm and a first point of the rear lower arm respectively;
    wherein, the antiparallelogram is deformable by folding between a first position corresponding to an unfolded position of the folding bearing structure and a second position corresponding to a folded position of the folding bearing structure, a change from the first position to the second position reducing a wheelbase of the folding bearing structure;
  two sides, a distance separating the two sides defining a width of the folding bearing structure, each of the two sides being defined in a vertical plane and comprising at least one distinct rear support point for each of the two sides and at least one front support point, the antiparallelogram of a respective one of the at least two folding devices deformable in the vertical plane of a respective one of the two sides of the folding bearing structure, and
  a central folding system to reduce the open width of the folding bearing structure as the folding bearing structure changes between the first position and the second position.

2. The folding bearing structure according to claim 1, comprising:
  at least one rear upper arm;
  at least one first sidebar located in the vertical plane, said first sidebar:
    being fixed by a fifth attachment by a first end of said first sidebar to the first end of the front lower arm;
    being fixed by a sixth attachment to the rear upper arm at a first upper point such that a length of the first sidebar is similar to a first segment formed by the second end and the third end of the antiparallelogram and approximately parallel to said first segment.

3. The folding bearing structure according to claim 2, wherein a triangle formed by the first end of the antiparallelogram, the fourth end of the antiparallelogram and the first upper point, is an isosceles triangle with its vertex at the first end of the antiparallelogram, said triangle remaining isosceles in all folded positions.

4. The folding bearing structure according to claim 2, wherein each of the at least two folding devices comprises a front upper arm and a second sidebar, said second sidebar:
  being fixed by a seventh attachment by a first end of said second sidebar to the first end of the rear lower arm;
  being fixed by an eighth attachment to the front upper arm at a second upper point such that a length of the first sidebar is similar to a second segment formed by the first and the fourth ends of the antiparallelogram and approximately parallel to said second segment.

5. The folding bearing structure according to claim 4, wherein characterized in that the first and second sidebars form an antiparallelogram, the seventh and eighth attachments being pivot links.

6. The folding bearing structure according to claim 2, wherein the first end of the first antiparallelogram defines a common rotation point for the at least one front lower arm and the at least one first sidebar.

7. The folding bearing structure according to claim 1, wherein the central folding system is a central cross.

8. The folding bearing structure according to claim 1, comprising a rear upper arm in each vertical plane of the two sides and a folding stiffening device to reduce a separation distance between the rear upper arms when a change is made between the first position and the second position.

9. The folding bearing structure according to claim 8, wherein the folding bearing structure forms a haptic system in contact on a bearing surface, such that when a rotation movement is initiated on the rear upper arms propagating towards the lower arms by means of pivot links, the wheels of said folding bearing structure under the action of firstly a rotation force of the lower arms and secondly a reaction force from the bearing surface are moved in a translation movement approximately parallel to the bearing surface.

10. The folding bearing structure according to claim 1, wherein each of the support points is located on a wheel, said folding bearing structure comprising:
  a first set of front wheels and a second set of rear wheels;
  wheel supports comprising the at least one front lower arm and rear lower arm, each comprising the first end to connect rotation axes of the wheels to the folding bearing structure.

11. The folding bearing structure according to claim 10, wherein each of the rear wheels is located in an axis substantially identical to a longitudinal axis of a front wheel except for the width of the wheels, a front wheel and a rear wheel forming the wheels on a first side of the two sides and the wheels on a second side of the two sides respectively of the folding bearing structure.

12. The folding bearing structure according to claim 1, wherein the first, second, third, fourth and fifth attachment of each of the folding devices and the folding bearing structure are pivot links.

13. The folding bearing structure according to claim 1, wherein
the front lower arm on each side of the folding bearing structure makes a first rotation movement about the first end of the antiparallelogram when changing from the first position to the second position and vice versa;
the rear lower arm and a rear upper arm on each side of the folding bearing structure makes a second rotation movement about the fourth end of the antiparallelogram when changing from the first position to the second position and vice versa.

14. The folding bearing structure according to claim 13, wherein each of the at least two folding devices comprises a first synchronization device for the first and second rotation movements.

15. The folding bearing structure according to claim 14, wherein the first synchronization device of the first and second rotation movements is made using the sidebar.

16. The folding bearing structure according to claim 1, comprising a device to synchronize folding of the at least two folding devices.

17. The folding bearing structure according to claim 1, comprising a guide stiffener to guide the folding bearing structure when wheels of the wheelbase are in the first position.

18. The folding bearing structure according to claim 17, comprising a rear upper arm in each vertical plane of the two sides and wherein the guide stiffener comprises a guide structure to guide the folding bearing structure and a folding stiffening device firstly to hold the rear upper arms at a predefined maximum distance and secondly to reduce a separation distance between the rear upper arms when a second folding is made.

19. The folding bearing structure according to claim 18, wherein the stiffening device keeps the rear arms and the rear support points in a same plane.

20. The folding bearing structure according to claim 18, wherein the stiffening device is fixed to the rear upper arms of the folding bearing structure and comprise eight connections fixed by pivot links comprising a first pair of isosceles quadrilaterals with the same dimensions and a second pair of isosceles quadrilaterals with the same dimensions, each of the quadrilaterals having a small side length substantially similar to a length of a large side of each of the quadrilaterals, the quadrilaterals in the first pair, being geometrically similar to the quadrilaterals in the second pair, the eight links comprising a locking position in which the rear arms are held at a maximum separation position.

21. The folding bearing structure according to claim 18, wherein the stiffening device comprises a plurality of sets of rods fixed to each other by pivot links and to the rear upper arms by pivot links, said sets of rods being connected by at least one antiparallelogram so as to synchronize folding of each set of rods.

22. The folding bearing structure according to claim 18, wherein the stiffening device comprises a sliding bar and a set of rods to hold the sliding bar in position between the rear arms, said rods being held to the rear upper arms by pivot links, a first set of rods being connected to the sliding bar by a sliding and pivot link and a second set of rods being connected to the sliding bar by a pivot link.

23. The folding bearing structure according to claim 18, wherein folding of at least one of the at least two folding devices is synchronized with folding of the stiffening device such that folding of the stiffening device causes folding of the at least one folding device.

24. The folding bearing structure according to claim 18, wherein the folding stiffening device comprises a motor to actuate folding and/or unfolding to reduce or increase the separation distance between the rear upper arms.

25. A supporting device comprising a folding bearing structure according to claim 1, wherein the supporting device is a folding stool, a folding chair, a stroller, a pram, a folding table, a folding wheelbarrow or a trolley.

* * * * *